(12) United States Patent
Yared et al.

(10) Patent No.: US 8,037,194 B2
(45) Date of Patent: Oct. 11, 2011

(54) DISTRIBUTED NETWORK IDENTITY

(75) Inventors: Peter Yared, San Francisco, CA (US); Gary Ellison, San Mateo, CA (US); Mark Hapner, San Jose, CA (US); Larry Abrahams, Los Altos, CA (US); Sheldon J. Finkelstein, Los Altos Hills, CA (US); Hal Stern, Livingston, NJ (US); John D. Beatty, San Francisco, CA (US); Aravindan Ranganathan, San Jose, CA (US); Sai Allavarpu, Pleasanton, CA (US)

(73) Assignee: Oracle America, Inc., Redwood City, CA (US)

( * ) Notice: Subject to any disclaimer, the term of this patent is extended or adjusted under 35 U.S.C. 154(b) by 210 days.

(21) Appl. No.: 11/864,537

(22) Filed: Sep. 28, 2007

(65) Prior Publication Data

US 2008/0016232 A1    Jan. 17, 2008

Related U.S. Application Data

(62) Division of application No. 10/309,773, filed on Dec. 3, 2002, now Pat. No. 7,610,390.

(60) Provisional application No. 60/337,234, filed on Dec. 4, 2001, provisional application No. 60/339,536, filed on Dec. 10, 2001, provisional application No. 60/365,943, filed on Mar. 19, 2002.

(51) Int. Cl.
*G06F 15/16* (2006.01)

(52) U.S. Cl. ........ 709/229; 709/217; 709/218; 709/219; 709/223

(58) Field of Classification Search .......... 709/217–219, 709/223, 229
See application file for complete search history.

(56) References Cited

U.S. PATENT DOCUMENTS

| 5,671,279 | A | 9/1997 | Elgamal |
| 5,774,670 | A | 6/1998 | Montulli |
| 5,815,665 | A | 9/1998 | Teper et al. |
| 5,825,890 | A | 10/1998 | Elgamal et al. |
| 5,826,242 | A | 10/1998 | Montulli |
| 5,944,824 | A | 8/1999 | He |
| 6,134,592 | A | 10/2000 | Montulli |
| 6,169,989 | B1 | 1/2001 | Eichstaedt et al. |

(Continued)

FOREIGN PATENT DOCUMENTS

EP        1089516        4/2001

(Continued)

OTHER PUBLICATIONS

"Open Sesame White Paper—Online Identification & Authentication Federations," Catavault, 2001, pp. 1-10.

(Continued)

*Primary Examiner* — Mohamed Wasel

(74) *Attorney, Agent, or Firm* — Robert C. Kowert; Meyertons, Hood, Kivlin, Kowert & Goetzel, P.C.

(57) ABSTRACT

A distributed network identity is provided. An identity provider stores a portion of a user's personal information. A service provider accesses user information from one or more identity providers. System entities such as identity providers and service providers can be linked to enable information sharing and aggregation. User policies and privacy preferences are provided to control how information is shared. A single sign-on architecture is provided where an identity provider is used to facilitate cross-domain authentication and to enhance user convenience. Service delegation features are also provided.

18 Claims, 21 Drawing Sheets

U.S. PATENT DOCUMENTS

| | | | |
|---|---|---|---|
| 6,185,685 | B1 | 2/2001 | Morgan et al. |
| 6,205,479 | B1 | 3/2001 | Dulai et al. |
| 6,226,752 | B1 | 5/2001 | Gupta et al. |
| 6,263,432 | B1 | 7/2001 | Sasmazel et al. |
| 6,453,353 | B1 | 9/2002 | Win et al. |
| 6,463,474 | B1 | 10/2002 | Fuh et al. |
| 6,584,505 | B1 | 6/2003 | Howard et al. |
| 6,816,903 | B1 | 11/2004 | Rakoshitz et al. |
| 6,816,970 | B2 | 11/2004 | Morgan et al. |
| 6,856,976 | B2 | 2/2005 | Bible et al. |
| 6,938,158 | B2 | 8/2005 | Azuma |
| 6,957,199 | B1 | 10/2005 | Fisher |
| 6,971,005 | B1 | 11/2005 | Henry et al. |
| 7,020,687 | B2 | 3/2006 | Mooney et al. |
| 7,020,773 | B1 | 3/2006 | Otway et al. |
| 7,089,585 | B1 | 8/2006 | Dharmarajan |
| 7,207,058 | B2* | 4/2007 | Barrett .............................. 726/4 |
| 2001/0001876 | A1 | 5/2001 | Morgan et al. |
| 2001/0023487 | A1 | 9/2001 | Kawamoto |
| 2002/0059531 | A1 | 5/2002 | Lai On |
| 2002/0120867 | A1 | 8/2002 | Mitchell et al. |
| 2002/0174335 | A1 | 11/2002 | Zhang et al. |
| 2003/0028763 | A1* | 2/2003 | Malinen et al. ............... 713/155 |
| 2003/0041240 | A1 | 2/2003 | Roskind et al. |
| 2003/0051134 | A1* | 3/2003 | Gupta ........................... 713/156 |
| 2003/0140230 | A1* | 7/2003 | de Jong et al. ............... 713/182 |
| 2005/0154913 | A1* | 7/2005 | Barriga et al. ................ 713/201 |
| 2005/0222963 | A1 | 10/2005 | Johnson |
| 2007/0136586 | A1* | 6/2007 | Barrett .......................... 713/168 |
| 2008/0021997 | A1* | 1/2008 | Hinton .......................... 709/225 |
| 2008/0092221 | A1* | 4/2008 | Tan et al. ........................ 726/10 |
| 2008/0183628 | A1* | 7/2008 | Oliver et al. .................... 705/71 |
| 2008/0271121 | A1* | 10/2008 | Hinton et al. ..................... 726/4 |
| 2009/0019534 | A1* | 1/2009 | Bakshi et al. ..................... 726/6 |
| 2009/0210930 | A1* | 8/2009 | Lexcellent et al. ............... 726/4 |
| 2009/0300355 | A1* | 12/2009 | Crane et al. ................... 713/168 |
| 2010/0004019 | A1* | 1/2010 | Di Caprio et al. ......... 455/552.1 |

FOREIGN PATENT DOCUMENTS

| | | |
|---|---|---|
| WO | 00/52900 | 9/2000 |
| WO | 01/38971 | 5/2001 |
| WO | 01/52023 | 7/2001 |

OTHER PUBLICATIONS

Ellison, C., "SPKI Requirements," The Internet Society, 1999 [online], [retrieved from the Internet on Apr. 9, 2003], <URL: http://www.ietf.org/rfc/rfc2692.txt>, pp. 1-13.

Ellison, C., "SPKI Certificate Theory," The Internet Society, 1999 [online], [retrieved from the Internet on Apr. 9, 2003], <URL: http://www.ietf.org/rfc/rfc2693.txt>, pp. 1-39.

"Glossary for the OASIS Security Assertion Markup Language (SAML)," [online], retrieved from the Internet, URL: http://www.oasis-open.org/committees/security/docs, published Jan. 10, 2002, pp. 1-13.

Shirey, R., "Internet Security Glossary," 2000 [online], [retrieved from the internet on Apr. 9, 2003], http:www.ietf.org/ rfc/rfc2828.txt>, pp. 1-189.

Examination Report from European Application No. 02 795 722.4-2413, Reference P020474EP IRH, received Jul. 12, 2011, 8 pages, Sun Microsystems, Inc.

Vipin Samar, "Single Sign-On Using Cookies for Web Applications," Oracle Corporation, IEEE, 1999, pp. 158-163.

* cited by examiner

Welcome to Service Provider A

Please Login: 1205

User Name: [    ]

Password: [    ]

SUBMIT

Select Identity Provider: 1210

[Identity Provider A ▼]

LOGIN 1215

Welcome to Service Provider A

Please Login:

User Name: [    ] — 1305

Password: [    ] — 1310

SUBMIT

FIG. 13

DISTRIBUTED NETWORK IDENTITY

CROSS-REFERENCE TO RELATED APPLICATIONS

This application is a divisional of U.S. patent application Ser. No. 10/309,773, filed Dec. 3, 2002 now U.S. Pat. No. 7,610,390, which claims priority to U.S. provisional patent application Ser. No. 60/337,234, filed on Dec. 4, 2001 now abandoned, entitled "Identity solution for a network," U.S. provisional patent application Ser. No. 60/339,536, filed on Dec. 10, 2001, entitled "Identity solution for a network," and U.S. provisional patent application Ser. No. 60/365,943, filed on Mar. 19, 2002, entitled "Federated Identity," from which priority is claimed under 35 U.S.C. §119(e) and which applications are incorporated by reference herein in their entireties.

TECHNICAL FIELD

This invention relates generally to network computing and, more particularly, to a distributed network identity architecture including single sign-on authentication, federation, and delegation among system entities.

BACKGROUND

Network-based services are becoming increasingly pervasive. For example, electronic commerce services are widely available and appealing for both individual consumers and businesses. From a consumer perspective, an abundance of services offers flexibility and economic benefits. Internet-based businesses or service providers routinely maintain an account relationship with their customers. Customer databases that include identity information facilitate and increase the integrity of transactions. Identity information helps a service provider deliver value to its consumer. Further, customer directories and data are important business assets. From the service provider viewpoint, a well-developed customer database creates revenue. A customer database enables targeted marketing and extended functionality that increases customer loyalty and generates business goodwill.

In a typical service provider framework, each service provider maintains a distinct user account database. For a user or consumer, this often means that the user must create a unique account with the service provider to access the services. One difficulty with this conventional identity framework is that it hinders service provider usability. For example, the user is required to enter repetitively similar identity information for each service provider, such as name, mailing address, and telephone number. Because user accounts are distinct for each service provider, the user must be singularly authenticated (e.g., a password-based login) for each service provider. The user also must remember or securely store the account name and password used for each service provider, which further frustrates and inconveniences the user. Because each service provider requires a unique account name, a user may have many different account names and identity profiles for various service providers by necessity. Alternatively, in the conventional context, a user may desire many different account names to reduce the likelihood that service providers will be able to engage in the unauthorized sharing of a customer's personal information. Thus, because of these complications, users may be highly selective of service providers or prefer to restrict their usage of network-based service providers.

Centralized identity methods address some of the limitations of the conventional identity framework. Centralized technologies can reduce the amount of repetitive data entry required when users access various service providers. However, the privacy and security of centralized identity data are paramount user concerns. Centralized identity technologies typically create a global name that is used for multiple affiliated service providers. A central authority stores the identity data and disseminates it to the service providers. The central authority may permit some user control over the information that is available to the service providers. The service providers could, however, collude to violate the user's privacy preferences because of the common visibility of the global user name. Further, a physical or an electronic breach of security at the central authority could expose large amounts of identity data to theft or to tampering.

From a service provider perspective, an additional problem with typical centralized identity methods is the control or ownership of the customer database. The central authority could impose restrictions on the service provider's use of its customer directory. This could have the undesirable consequence of restricting the service provider's ability to generate revenue from a valuable business asset.

Additionally, other identity approaches have been network- or application-specific implementations. One disadvantage of these approaches is that they are often limited to homogeneous networks or operate only with specific computing devices. For example, a network- or application-specific single sign-on architecture may enable a user to access the resources of a local or a closely administered service provider, but not resources offered by other service providers. Therefore, network- or application-specific approaches are often limited in scope to local or closely administered environments and offer a user few convenience benefits outside of these environments.

What is therefore needed is an identity architecture that is decentralized or distributed for user authentication and storage of identity information, that provides single sign-on and single logout convenience for users, that permits users to link accounts and to set enforceable privacy controls, and that provides for delegation of services among service providers.

SUMMARY OF THE INVENTION

An embodiment of the present invention provides a distributed network identity. Users store portions of their identity information with one or more identity providers. Identity information includes attributes such as the user's name, mailing address, e-mail, telephone number, and credit card number. An identity provider is an entity that creates, manages, and stores identity information for a plurality of users. A service provider is an entity that provides a service to a user and makes use of the aspects of the user's identity it has been authorized to access. A single sign-on architecture is provided to facilitate user interactions with service providers. A user can authenticate with an identity provider using, for example, a password-based credential or any other authentication mechanism. Service providers can then rely upon that authentication to provide access to authorized resources without requiring additional authentication. In some embodiments, however, additional authentication is performed because of the quality of the credential the user initially used to sign into the identity provider. For instance, a service provider performing banking transactions may require a stronger form of authentication (e.g., a certificate) to assure the integrity of the transaction.

In another embodiment, users create account linkages or federations among identity providers and service providers. An explicit trust chain is created when a user invokes account linking between a service provider and an identity provider. Accounts are linked using, for example, dynamically generated handles, which are shared by the service provider and identity provider being linked. When two elements of a trust chain communicate, they can differentiate a user by the shared secret or handle. The handle or handles are stored in user directories in each of the linked system entities. Users manage these links by setting user policies and privacy preferences. According to one embodiment, user policies are enforceable because a username is resolved within a limited namespace. That is, each link of a trust chain forms a namespace. Providers resolve the username and enforce the user's policies at each link in the trust chain and, therefore, cannot skip over each other in the trust chain because the account handle or handles are not resolvable in a global namespace.

In a further embodiment, system entities communicate using a web services architecture for back channel communications. Web services uses an application layer protocol, such as Hypertext Transport Protocol (HTTP) for communications. System entities exchange user profile data using Extensible Markup Language (XML) schemas. Simple Object Access Protocol (SOAP) encapsulates the XML data and provides interoperability among the numerous computing devices that can host service providers and identity providers.

In a still further embodiment, service delegation provides additional web services interactions. Service providers that are accessible to other service providers via an identity provider (i.e., a federated trust chain) can provide delegated services. For example, a user can specify in a primary identity provider a mobile phone serviced by a mobile operator. Service delegation embodiments include an identity provider functioning as a service gateway and as a service directory. An example service delegation is a merchant service provider that contacts an identity provider to send the user a Short Message Service (SMS) message using the user's mobile phone service provider. Service tickets can be used to authorize a service provider to perform the delegated service.

Further features of the invention, its nature and various advantages will be more apparent from the accompanying drawings and the following detailed description.

BRIEF DESCRIPTION OF THE DRAWINGS

The accompanying drawings, which are incorporated in and constitute a part of this specification, illustrate several embodiments of the invention and, together with the description, serve to explain the principles of the invention.

FIG. 12 illustrates a service provider user interface.

FIG. 13 illustrates an identity provider user interface.

DETAILED DESCRIPTION OF THE EMBODIMENTS

The present invention is now described more fully with reference to the accompanying figures, in which several embodiments of the invention are shown. The present invention may be embodied in many different forms and should not be construed as limited to the embodiments set forth herein. Rather these embodiments are provided so that this disclosure will be thorough and complete and will fully convey the invention to those skilled in the art.

In an embodiment of the present invention, an identity provider is an entity that creates, maintains, and manages identity information for principals and other system entities. Identity information includes user attributes such as name, mailing address, e-mail address, and telephone number. User attributes can be further assembled into user profile data to provide additional flexibility and personalization. For example, a "personal" profile contains attributes such as social security number, credit card data, billing address, and affinity memberships (e.g., frequent flyer numbers). A "work" profile contains attributes such as work address, work telephone numbers, and work e-mail address. Identity information further includes preferences or policies that describe permissible (or impermissible) uses of user attributes or profile data. Identity information is described in further detail below and with reference to FIG. 24. In an embodiment, a service provider is an entity that provides a service to a principal and makes use of the aspects of a principal's identity it has been authorized to access. A principal is a system entity whose identity can be authenticated. One example of a principal is a natural person functioning as an end user.

A. System Architecture

Figure 1:
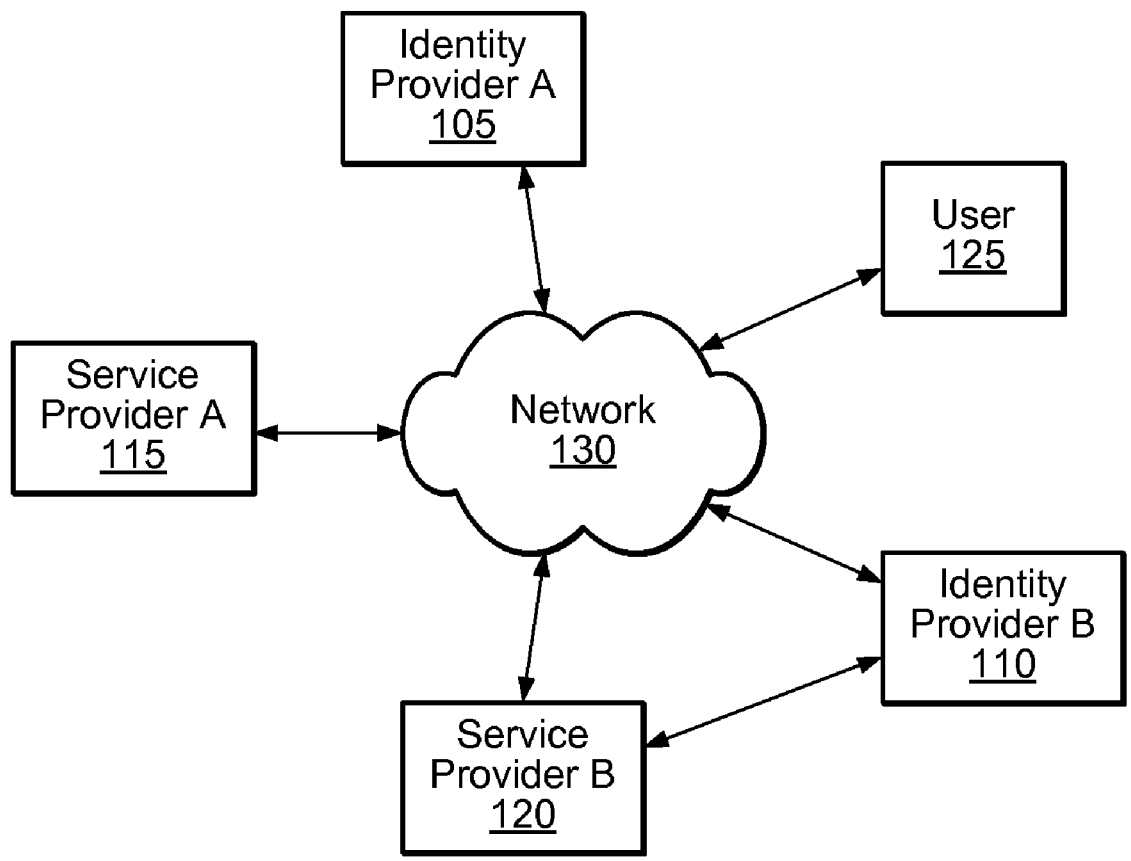
FIG. 1 is an illustration of a distributed identity system in accordance with the present invention.

FIG. 1 is an illustration of a distributed identity system in accordance with the present invention. The illustrated embodiment shows system entities such as identity provider A 105, identity provider B 110, service provider A 115, service provider B 120, and user 125 each coupled to network 130. Further, identity provider B 110 and service provider B 120 are separately coupled to one another. This system architecture enables, for example, identity provider A 105 to communicate with service provider B 120 across network 130. Network 130 is configured to provide connection-oriented or connectionless connectivity to the communicating nodes. For example, identity provider B 110 can communicate with service provider B 120 through network 130 and via the illustrated peer connection. In an embodiment, system entities such as identity provider A 105 and service provider A 115 are in distinct domains and interact using the hypertext transport protocol (HTTP). Exemplary details of interaction between an identity provider and a service provider to enable distributed network identity are described below.

In an embodiment, a system entity is a process that incorporates a distinct set of functionality. For example, identity provider A 105 incorporates functionality to create and to maintain identity information. The functionality of a system entity can be implemented by program instructions that execute in an appropriate computing device. One skilled in the art will recognize that numerous computing devices are appropriate for the illustrated system architecture. Example devices include enterprise servers (e.g., Sun Fire 15K, commercially available from Sun Microsystems, Inc., Santa Clara, Calif.), application servers, workstations, personal computers, network computers, network appliances, personal digital assistants, game consoles, televisions, set-top boxes, premises automation equipment, point-of-sale terminals, automobiles, and personal communications devices (e.g., cellular handsets). The program instructions can be distributed on a computer readable medium or storage volume. The computer readable storage volume can be available via a public network, a private network, or the Internet. Program instructions can be in any appropriate form, such as source code, object code, or scripting code.

In an embodiment, network 130 is a partially public or a wholly public network such as the Internet. Network 130 can also be a private network or include one or more distinct or logical private networks (e.g., virtual private networks). Additionally, the illustrated communication links to network 130 and between identity provider B 110 and service provider B 120 can be wireline or wireless (i.e., terrestrial- or satellite-based transceivers).

Although they are distinctly illustrated, in certain embodiments, multiple system entities can be hosted by a single computing device or group of computing devices functioning as a virtual machine (e.g., a clustered configuration). For example, a server can host both identity provider B 110 and service provider A 115. That is, a trusted entity, such as a banking institution, can be an identity provider for its customers, as well as provide online services. Similarly, computing devices coupled to network 130 can be configured to host identity provider A 105 and service provider B 120. One skilled in the art will recognize that depending on configuration, system entities communicate locally using a protocol such as HTTP, by interprocess communication, or by some other means. Although user 125 is singularly illustrated, embodiments of the present invention support a plurality of concurrent users. User 125 can be a principal, such as a natural person, computer program, or user agent. Similarly, embodiments include a plurality of service providers and identity providers operating concurrently on network 130. One skilled in the art will recognize that methods, apparatus, systems, data structures, and computer program products implement the features, functionalities, or modes of usage described herein. For instance, an apparatus embodiment can perform the corresponding steps or acts of a method embodiment.

In an embodiment, single sign-on refers to the ability of an entity to be authenticated sufficiently to gain access to all authorized, secured resources throughout one or more systems without additional authentication. A number of factors affect how much access an entity achieves using single sign-on including the type of authentication provided and the service provider's access control policy. In the illustrated embodiment, for example, user 125 can authenticate with identity A provider 105, obtain an assertion from identity provider A 105, and present the assertion to service provider A 115. An authentication assertion conveys information about an act of authentication. Once user 125 has authenticated with identity provider A 105, user 125 can use service provider A 115 and other service providers (e.g., service provider B 120) without having to login or to sign on again. Advantages of single sign-on for user 125 include convenient access to service providers and account management flexibility. As further described below, the system architecture enables a user to distribute identity information among identity providers and to control how the identity information is shared and accessed.

Embodiments of the present invention include single sign-on, federated identity, and web services features. One skilled in the art will appreciate that the described features can be configured to collaborate or function independently or in any combination. As an example of collaboration, web services features provide a communication framework for system entities. An identity provider uses aspects of web services to service requests for XML data structures, such as user profile data. Furthermore, during a single sign-on operation, a service provider can use web services to request and to receive user profile data. Although the single sign-on architecture does not require that system entities be federated or linked in order to perform cross-domain authentication, account federation preserves existing identity data and enables delegated services. By federating an account with an identity provider, for example, a user can continue to login to a service provider using an existing service provider-specific username and also have the benefits of using the identity provider for single sign-on authentication with other service providers. Further, the identity provider can be federated with other service providers that provide various applications. As described in further detail below, account federation enables system entities to collaborate to provide the user a service or to perform a service on behalf of the user. When authorized by a user policy, for example, a calendar service can send a reminder to a user's mobile telephone using the mobile telephone service provider. In this example, the identity provider, the calendar service, and the mobile telephone service use web services to interact or to exchange data. By using web services, these system entities can collaborate regardless of the similarity or dissimilarity of the computing devices hosting them.

B. Single Sign-On Architecture

According to an embodiment of the present invention, an identity provider and a service provider communicate authentication information (e.g., a credential) to implement a single sign-on architecture. Generally, an identity provider authenticates a user's identity and passes a credential to a service provider. The service provider receives the credential and, in some embodiments, user profile data about the user. The service provider then permits the user to access authorized services without requiring additional authentication. After a user initially authenticates with an identity provider, the user does not need to be further authenticated to access authorized services at one or more service providers.

A single sign-on architecture enables users to obtain a network identity through an identity provider of their choosing, and to be able to use that identity to sign into any other compliant service provider. The user profile data at the identity provider securely stores commonly used personal information. In a merchant service provider example, the personal information can be used to fill out an order form automatically. User profile data can also include credit card and billing information (e.g., wallet services) that would facilitate express purchases. In a single sign-on environment, a user is able to use some service provider features without "signing up" or creating a local service provider account. One skilled in the art will appreciate that the amount of access and authorization depends on service provider policies. For example, service providers can be configured according to tiers of service.

1. Communication Using Cookies

Cookies are an indirect communication mechanism that can enable a cross-domain single sign-on implementation. In the context of the HTTP protocol, a cookie refers to the state information that passes between a server and a user, which is stored by the user. The cookie is a mechanism of storing information on an Internet browser that can be presented to websites. An identity provider can write a cookie that a service provider is able to recognize and thereby authenticate the user. That is, an authentication cookie can include encrypted details of the user's authentication in a way that would be convenient for service providers to parse. However, the default security settings of the predominant clients (e.g., Internet browsers) only permit cookies to be read by the website that wrote the cookie. Unless users lower their security settings, a service provider would not be able to read a cookie written by an identity provider. Although the default security settings may prevent cookies from being used to exchange data between an identity provider and a service provider, identity providers and service providers are not precluded from writing cookies to store session or persistent information.

2. HTTP Redirect Communications

An additional mechanism for cross-domain communication includes HTTP redirection. Redirection causes a browser to access a different resource identified by a uniform resource identifier (URI) or uniform resource locator (URL). A uniform resource identifier (URI) is a string of characters used for identifying an abstract or physical resource. A URI or URL can contain additional information, such as a query parameter, to send to the destination website. In an embodiment, an identity provider embeds a secure credential as an HTTP parameter for a service provider. A credential is data that is transferred or presented to establish either a claimed identity or the authorizations of a system entity. Credentials generally include the data necessary to prove an assertion. By embedding a credential, an identity provider can communicate the necessary authentication information to a service provider. Therefore, HTTP redirect enables a single sign-on framework within the existing HTTP infrastructure. Table 1 illustrates an example of parameter passing with HTTP redirect.

TABLE 1

Embedding a Parameter within an HTTP Redirect

| | |
|---|---|
| http://www.foobar.com/auth | Redirects to foobar.com |
| http://www.foobar.com/auth?id=1234 | Redirects to foobar.com and also passes an HTTP parameter "ID" with the value "1234" |

An embodiment of the present invention uses the security assertion markup language (SAML) to exchange authentication and authorization information among system entities. For further details of SAML, see the "SAML 1.0 Specification Set" available from the Organization for the Advancement of Structured Information Standards (OASIS) at http://www.oasis-open.org. One skilled in the art will appreciate other protocols can be used to implement the described authentication and authorization functionality. Although SAML presents a mechanism for embedding a credential within a URI, there can be a limit on the overall size of a URI. This limit varies from browser to browser and is particularly small in some computing devices (e.g., mobile handsets).

a) SAML Artifact Web Profile

In an embodiment, SAML Artifact is used to embed a credential in a manner that overcomes the URI size limitation. The embedded credential can be a SAML assertion. A SAML assertion represents data regarding an act of authentication performed on a principal, attribute information about the principal, or authorization permissions applying to the principal with respect to a resource. An artifact is small enough in its URI-encoded form to fit in a URI without concern for size limitations. The artifact itself is a token with which the service provider can query the identity provider to receive a full SAML assertion. SAML Artifact, therefore, uses direct communication between the service provider and the identity provider. In one embodiment, the artifact has the property of being an opaque, random or pseudo-random nonce. A nonce is a random or non-repeating value that is included in data exchanged by a protocol, usually for the purpose of guaranteeing liveness and thus detecting and protecting against replay attacks. Randomness in such a token protects the token from being guessed by an adversary.

b) SAML Form Post Web Profile

In an embodiment, browsers that support JavaScript can perform the redirect by sending a hypertext markup language (HTML) page with form elements that contain the data to send with a JavaScript that automatically posts the form. In an embodiment where system entities do not support JavaScript, the data can be embedded within the URI as described above.

SAML Form Post can be used to embed a credential within an HTTP form. Form Post does not use direct communication between the service provider and the identity provider to obtain an assertion. In this embodiment, there is no size limitation because a full form can be used. Therefore, a full SAML assertion can be included. The credential can be encrypted with the public key of the service provider or a symmetric key for security. According to an embodiment of the present invention, both SAML Form Post and SAML Artifact are implemented to provide single sign-on features to a broad range of system entities and computing devices. One skilled in the art will recognize that SAML Form Post is implemented in addition to SAML Artifact due to its dependence on JavaScript. Table 2 illustrates using JavaScript to pass parameters automatically.

TABLE 2

Using JavaScript to Pass Parameters Automatically

```
<HTML>
<BODY
ONLOAD="javascript:document.forms[0].submit( )">
<FORM METHOD="POST" ACTION="www.foobar.com/auth">
<INPUT TYPE="HIDDEN" NAME="ID" VALUE="1234"/>
</FORM>
</BODY>
</HTML>
```

3. HTTP Redirect/Form Post Dataflow

Figure 2:
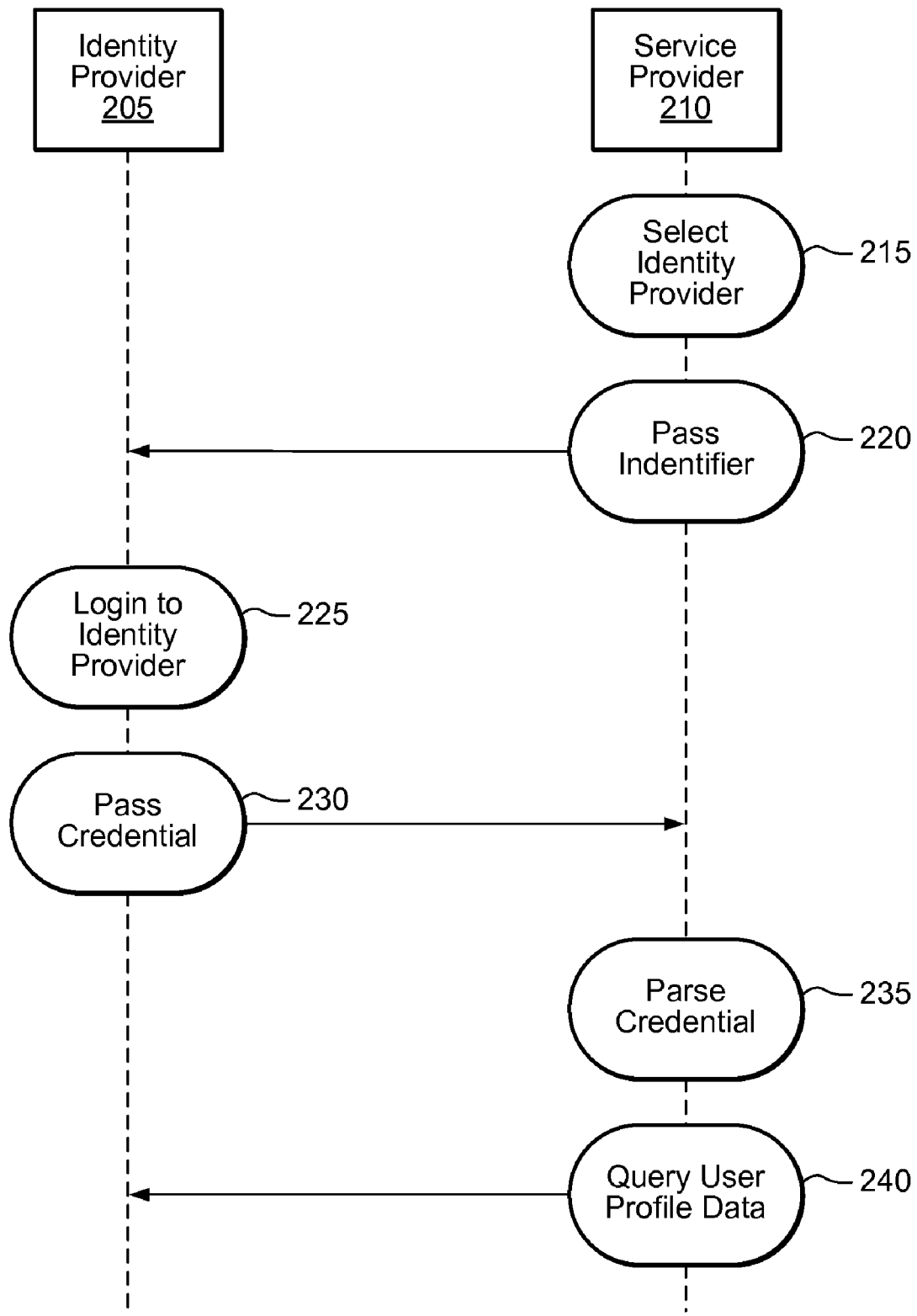
FIG. 2 is an interaction flowchart illustrating a single sign-on embodiment including service provider initiated back channel communication.

FIG. 2 is an interaction flowchart illustrating a single sign-on embodiment including service provider initiated back channel communication. The illustrated embodiment shows communication of user authentication information between identity provider 205 and service provider 210. A user that desires identity authentication with service provider 210 goes to service provider 210 and selects identity provider 215. In an embodiment, the user is a natural person using an Internet browser to communicate with service provider 210. An identity provider can be selected from a list presented on the login page of service provider 210. One skilled in the art will recognize that an identity provider can be selected in numerous other ways, such as typing the domain or host name of the identity provider. Further details of a service provider user interface are described below and with reference to FIG. 12.

In this embodiment, the user selected identity provider 205. Next, the user's browser is redirected to identity provider 205 with an embedded identifier 220 indicating originating service provider 210. As described above, in an embodiment the redirect uses SAML artifact or form post depending on the capabilities of the system entities. The user can then login to identity provider 225 using, for example, a password-based identity credential. Identity provider 205 then processes the login and upon successful login, redirects the user's browser back to service provider 210 passing a transient, encrypted authenticated credential 230 embedded within the URI. The authenticated credential can be encrypted with the public key of service provider 210 or a symmetric key. For additional security, a secure sockets layer (SSL) connection can be used. In an embodiment, user profile data is not passed via the redirect.

Service provider 210 then parses the embedded credential 235 from the URI and uses back channel communications to query user profile data 240 from identity provider 205. In an embodiment, back channel communications use the Simple Object Access Protocol (SOAP). SOAP enables a variety of computing devices to interoperate over HTTP. For example, service provider 210, which is hosted by a personal computer, can request identity information from identity provider 205, which is hosted by an enterprise server. In an embodiment, system entities use a common set of identity schemas to communicate information, such as user profile data. SOAP is an extensible markup language (XML) envelope and data encoding technology used to communicate information and requests across an HTTP network. Although embodiments of the present invention use a web services architecture for communicating information across a network, one skilled in the art will recognize that other communications technologies can be used. For example, on a proprietary network, a customized protocol could be implemented. The web services architecture enables service providers to trigger services for users and requests for information about users from identity providers. The web services architecture is described in additional detail below.

Figure 3:
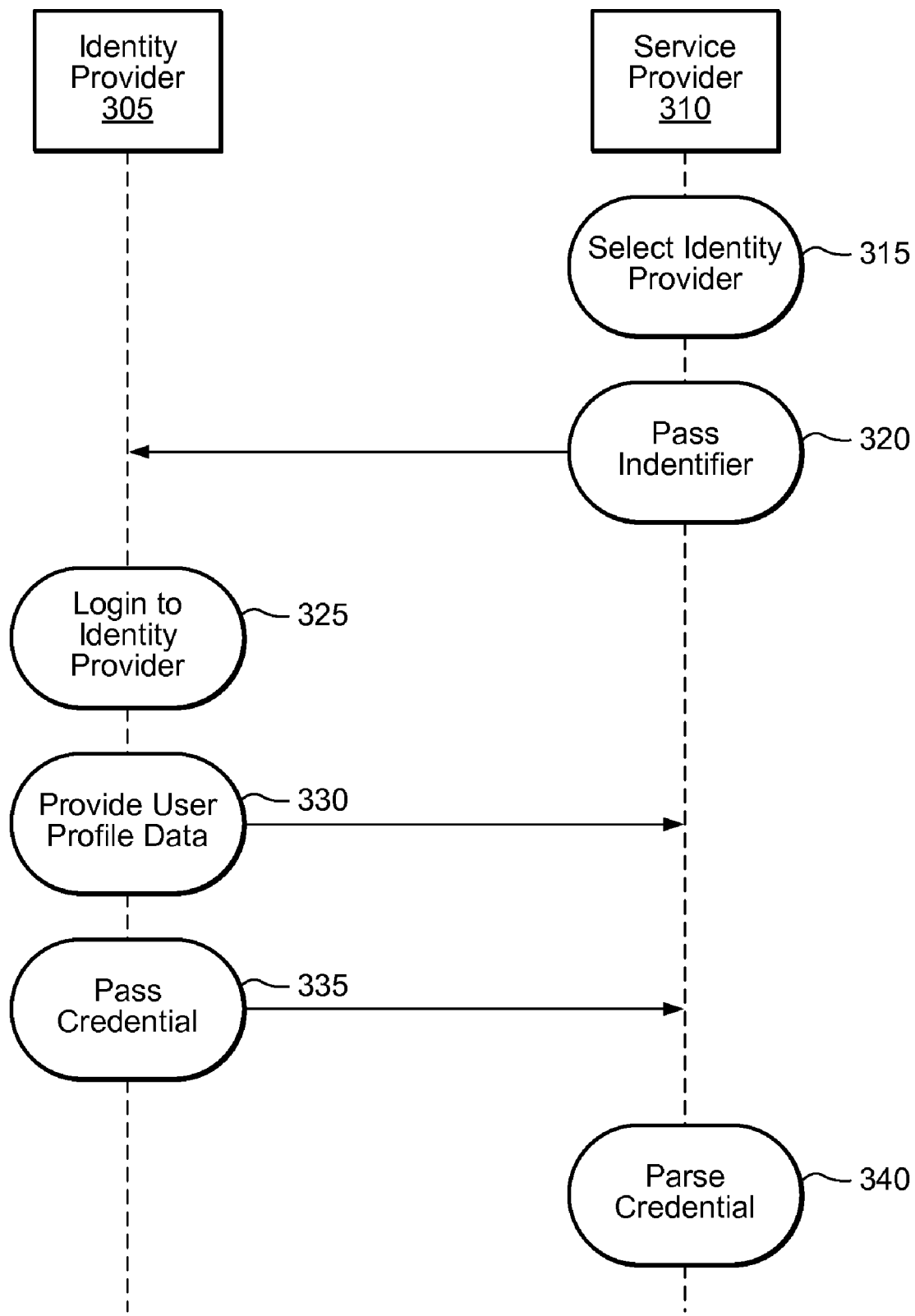
FIG. 3 is an interaction flowchart illustrating a single sign-on embodiment including identity provider initiated back channel communication.

FIG. 3 is an interaction flowchart illustrating a single sign-on embodiment including identity provider initiated back channel communication. Similar to the embodiment illustrated in FIG. 2, FIG. 3 shows communication of user authentication information between identity provider 305 and service provider 310. In FIG. 3, however, an alternative mechanism for back channel communication is illustrated. A user that desires identity authentication with service provider 310 goes to service provider 310 and selects an identity provider 315. Next, the user's browser is redirected to identity provider 305 with an embedded identifier 320 indicating originating service provider 310. The user can then login to identity provider 325, if necessary. In an embodiment, a user would not need to login to identity provider 305 if the user is already actively authenticated with identity provider 305 (e.g., using a session cookie described below). Identity provider 305 then initiates an outbound HTTP request to indicate that the user has been authenticated and to provide user profile data 330 to service provider 310. An advantage of this implementation is that service provider 310 does not need to enable outbound HTTP requests in its firewall. Next, identity provider 305 redirects the user's browser back to service provider 310 passing a transient, encrypted credential 335 embedded within the URI. Service provider 310 then parses the embedded credential 340 from the URI to authenticate the user.

Both identity provider 305 and service provider 310 can write cookies in the user's browser. In an embodiment, identity provider 305 writes a session cookie the first time a user logs in and recognizes that the user has already signed in when a service provider redirects the user. Service provider 310 can in turn write a persistent cookie with a handle for the user and indicate the user's selected identity provider in its internal user directory for the user. Such persistent cookies would not allow impersonation because they indicate only a user's identity provider preference.

Figure 4:
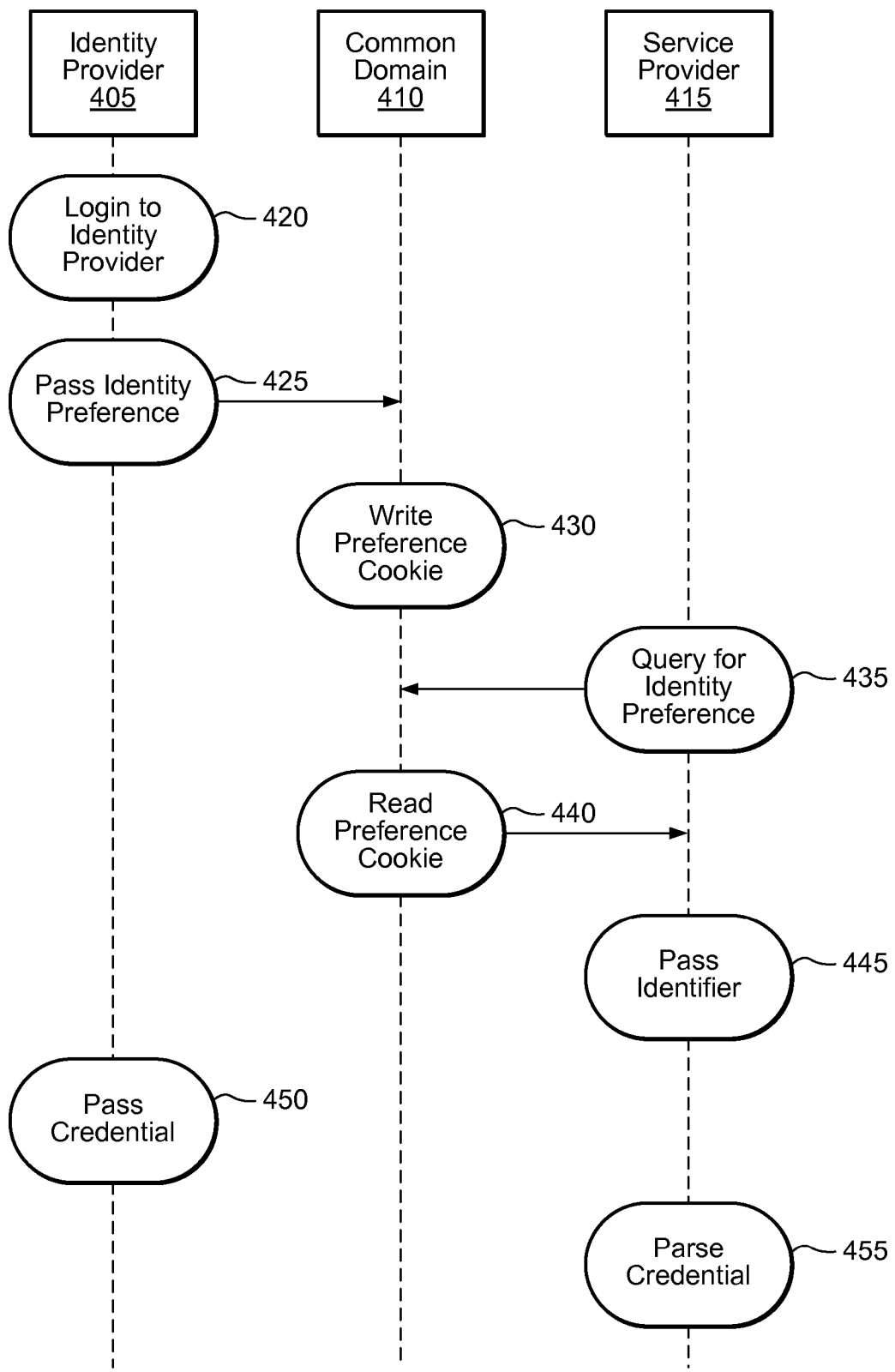
FIG. 4 is an interaction flowchart illustrating a single sign-on embodiment including common domain facilitation.

FIG. 4 is an interaction flowchart illustrating a single sign-on embodiment including common domain facilitation. Common domain facilitation is a feature of the present invention that further enhances user convenience. The illustrated embodiment includes identity provider 405, common domain 410, and service provider 415. It can be cumbersome for users to have to choose continually from an array of identity providers each time they go to a new service provider. Therefore, identity provider 405 writes a cookie that service provider 415 can read. However, due to the cookie constraint regarding default security settings described above, a common domain 410 that is accessible to all parties is introduced. In an embodiment, a computing device hosting common domain 410 is stateless. That is, common domain 410 reads and writes cookies based on parameters passed within redirect URIs or form posts. In an embodiment, common domain 410 can be hosted using third level domains that point to specific Internet protocol (IP) addresses. For example, a service provider entitled "Foo.com" uses a third level domain "foo.identity.org" that points to an IP address specified by Foo.com.

When a user authenticates with identity provider 420, identity provider 405 redirects the user's browser to common domain 410 with an identity preference parameter 425 that indicates that the user is using identity provider 405. Common domain 410 writes a cookie in the user's browser with that preference 430 and redirects the user's browser back to identity provider 405. When the user navigates to service provider 415, the service provider can redirect the user's browser to common domain 410 to query for the identity preference 435. Common domain 410 reads the cookie 440 and redirects the user's browser back to service provider 415 with the user's identity provider preference embedded in the URI. Service provider 415 now knows that the user prefers identity provider 405. In an embodiment, service provider 415 authenticates the user with identity provider 405 by passing an identifier 445 with HTTP redirect or form post. Identity provider 405 recognizes the user and passes a credential 450 back to service provider 415. Service provider 415 then parses the credential 455 to authenticate the user. In another embodiment, service provider 415 prompts the user to link or to federate the account with identity provider 405. Account linking is described below in further detail.

4. User Scenarios

The following description includes further examples of how a single sign-on architecture is used.

a) Establishing a New Network Identity and Linking to Additional User Information A user is offered to create a network identity at a site the user trusts, such as a banking institution. The user fills out an online form with the minimum information being a name and password. Other information can be filled out including home and ship to addresses, phone numbers, and optionally, the bank account number. If a bank account number is used, a background task to authenticate the user is initiated to make sure the user is a member in good standing. If so, the user gets tagged a key identifying the user with second level authentication. For users without a bank account, the user gets tagged with a first level authentication.

The user then goes to their insurance website (also network identity compliant), and taps on the identity button to use the network identity without having to sign on again. The user enters his insurance policy number and this information then gets linked to his network identity. The banking information is kept at the bank and the insurance information is kept by the insurance company, but get linked together in the distributed network identity architecture.

b) Not Logged into an Identity Provider and Visiting a Network Identity-Enabled Merchant The user browses to a network identity-enabled merchant but has not previously logged into any network identity-enabled site. The user clicks on the "Sign-in" icon and is automatically redirected to a "redirector" server that only stores where the user's root nameserver is located and any links to other servers that holds other information about the user. The user is then automatically directed to the identity provider's web site. The user is presented with a network identity login screen, which can be co-branded with the service provider.

c) Migrating an Existing Identity Provider Identity to be Network Identity-Enabled A user wishes to convert his existing account with an identity provider into a network identity-enabled account. The user browses to the identity provider's website and logs in using an existing username and password. The user then clicks on a link "Network Identity enable my ID." The user is presented with information on what it would mean to become network identity-enabled. The user chooses to proceed and is then asked to confirm the personal information and the fact that this information could be shared with other network identity-enabled websites. After agreeing, the account becomes network identity-enabled and uses the same username and password.

d) Logged into a Network Identity and Visiting a Merchant Already Authorized to Recognize User In this scenario, the user has already "logged in" to a network identity-enabled site and traverses to another site that the user previously visited. In this case, there should be no intervention of the user to re-login and the user should automatically be able to use the site as long as the user did not log out or quit the browser session.

e) Logging Out of a Network Identity Explicitly

While logged into a network identity-enabled identity provider and traveling through any network identity-enabled site, the user sees a "Sign Out of Network Identity" graphic or link. The user clicks on the link and is logged out of all network identity-enabled sites and all sessions are terminated. To prevent unauthorized use if the user leaves the system but does not explicitly log out, the network identity-enabled identity provider automatically terminates the session after a user configurable period of non-use.

f) Logging Out of a Network Identity Implicitly When Exiting Browser Session

While logged into a network identity-enabled identity provider, the user exits the browser or it crashes. When the user restarts the browser, the user is prompted to re-authenticate.

g) Making an Express Purchase at a Network Identity-Enabled Merchant

The user decides to make a purchase at a network identity-enabled merchant (i.e., service provider) while logged in with an identity provider. After adding items to the shopping cart, the user clicks on "Checkout." The merchant then presents the choice of obtaining the payment information from the user's identity provider. The user clicks "Express Payment with Network Identity" and is presented with a list of the user's credit card and address "handles." These handles are of the following form: credit card name and last four digits, and city and zip code, e.g. "Visa xxx-xxx-xxx 1234", "San Jose 95134." The user then selects the credit card and shipping address the user wishes to use for this purchase and clicks on "Submit." The complete credit card and address information per the user's selection is retrieved from the user's profile data, and a new page presents the order details. The user clicks on "Complete Purchase" and receives confirmation that the purchase was successful.

h) Updating Account Information

The user logs into the identity provider with the appropriate network identity. The user then clicks on "Update Account." The user is presented with the current information in editable fields. The user updates the information and clicks on "Update." The changes are stored and will be automatically available to service providers when the user visits them.

i) Logged into a Network Identity and Browsing to a "Sensitive" Portion of a Network Identity-Enabled Website While logged into a network identity, the user accesses a sensitive portion of a network identity-enabled website. For example, the user wishes to place a trade with the user's online broker. The browser is redirected to the user's identity provider where the user is prompted to re-enter the user's password. The user types in the password and clicks "Verify password." The browser is then redirected to the user's online broker and the user is now able to execute trades for the next hour. This functionality adapts the type of authentication used by the user. In an embodiment, the user is in control of what information is shareable and what remains privileged.

j) Logging into a Network Identity Via Non-Browser Clients

The user authenticates to a non-browser client such as an instant messaging client or a peer-to-peer client using the user's network identity username and password. If such application is network identity enabled, other web services can use, where appropriate, these services in the same fashion as traversing between network identity enabled websites.

k) Logging into a Network Identity Using Non-Pc Devices Such as Cell Phones, Video Game Consoles, Set-Top Boxes, and PDAs.

A non-PC device is used to log into an identity provider and the user visits other network identity-enabled websites using that identity authentication. The user is able to use single sign-on and express payment with network identity-enabled websites the same way as from a workstation or personal computer.

l) Logging into a Network Identity Using Alternative Authentication Mechanisms Such as Smart Cards, Token Cards, Biometrics, and PKI Certificates A distributed network identity supports both physical and software-only authentication mechanisms as an alternative to the user/password combination. The user's identity provider should specify the authentication options the user has available. By using more secure mechanisms such as token cards and smart cards, the user has authorization to more sensitive and secure areas of a network identity-enabled website (e.g., different levels of authentication). Network identity-enabled websites are provided with the user's authorization level (based on the user's authentication mechanism) when the user signs in to those sites using the user's network identity. For example, the user can sign in to the user's online broker using just the user's username and password and be able to view the user's portfolio but not be able to execute any trades. If the user signs in using a smart card, the user is able to execute trades as well.

m) User Viewing Authorization Permissions for a Service Provider

The user visits the primary identity provider, and clicks on a "Manage Account" link. The user is presented with a page listing all the service providers to whom the user has granted access. Also listed besides each service provider's name is a summary of access rights for that service provider. The user clicks on a service provider to bring up a page with authorization details for that particular service provider. The page lists the user's profile attributes (e.g., name, e-mail, address, zip code, wallet), and each attribute has a check box next to it. A check mark in the check box indicates that the service provider has been granted access to that attribute. If the check box is clear, the service provider does not have access to that information. The page also lists the date and time when the user initially granted the service provider access to the user's identity. The service provider list is can be derived in two ways: (1) the sites the user visits is kept in a list with information about the shared information and the last visit and transaction (i.e., assuming there was one), or (2) a sortable list of network identity-enabled sites is presented to the user.

n) User Editing Authorization Permissions for a Service Provider

The user can modify permissions for a service provider while viewing the authorization details page. To remove access to a shared attribute, the user clears the corresponding check box. To add access to an attribute, the user selects the corresponding check box. By clicking an "Update Permissions" button the authorization changes are committed. The new policy is effective the next time the user signs in with the service provider.

o) User Completely Revoking a Service Provider's Access to the User's Network Identity While viewing the service provider's authorization details page, the user can click on a "Disable this service provider's ability to recognize me" link. The user is then presented with an explanation that the user will no longer be able to sign-in to the service provider automatically, and the service provider will not be able to recognize the user or access any of the user profile data. The user clicks on a "Confirm" button to delete the service provider from the user's authorization list. The user's session with that service provider should automatically terminate and any future visits should not allow automatic sign-in.

p) User at Service Provider A Conducts Transaction Also Involving Service Provider B The user is conducting transactions at network identity-enabled service provider A. There the user sees a special offer provided in conjunction with one of service provider A's partners, service provider B, also a network identity-enabled service provider. The user clicks on the offer and is transferred to service provider B, where the user is automatically recognized as a network identity user without having to sign-in explicitly. There the user is able to redeem the offer and to complete the user's transaction, with service provider A and service provider B being able to exchange the user's transaction information with each other. If additional information is needed to complete the transaction, a lookup to the redirecter nameserver could auto fetch the appropriate data as long as it does not break user policy and privacy settings.

q) A Network Identity Authenticated User Visits Another SSO Network Merchant

User has signed in to network identity provider and visits a merchant of another single sign-on (SSO) network called "Foo." The user clicks on the "Foo sign-in" link. The user is redirected to the user's network identity provider where the user explicitly grants the merchant access to the user's identity profile. The user is then redirected to the merchant who automatically recognizes the user. The Foo merchant can now access the network identity information to which the user has granted access. The user can also makes express purchases at this merchant if the user has authorized the merchant to access the user's wallet profile.

r) A User Authenticated With Another SSO Network Visits a Network Identity-Enabled Merchant User has signed in to Foo and clicks on a "Network Identity sign-in" link. After a redirect through the Foo authentication system, the user is logged in to the merchant. The network identity-enabled merchant can now access the user's Foo identity information. The user can also makes express purchases at this merchant using the user's Foo wallet.

C. Federating Identities

Users are able to store portions of their identity with multiple identity providers and aggregate them as necessary to form a complete identity. Identity providers and service providers create account linkages or federations in order to construct a trust chain. At each identity provider, a user can store a portion of his or her personal data that the user feels confident hosting only with that identity provider. For example, a user could choose to store financial information with a bank, health information with a healthcare provider, and calendar, e-mail, and contacts information with a productivity tools provider. Because each of these accounts are linked, the user could choose to view or to enable access to an integrated view of this data at a network identity-compliant service provider. Although the user can create identity provider-to-identity provider linkages as described below, none of the user's identity providers are inherently able to see information stored at any other identity provider. That is, the user explicitly grants permission to anyone or to anything wanting to aggregate any of the user's information, and the user can revoke this permission at any time.

Figure 5:
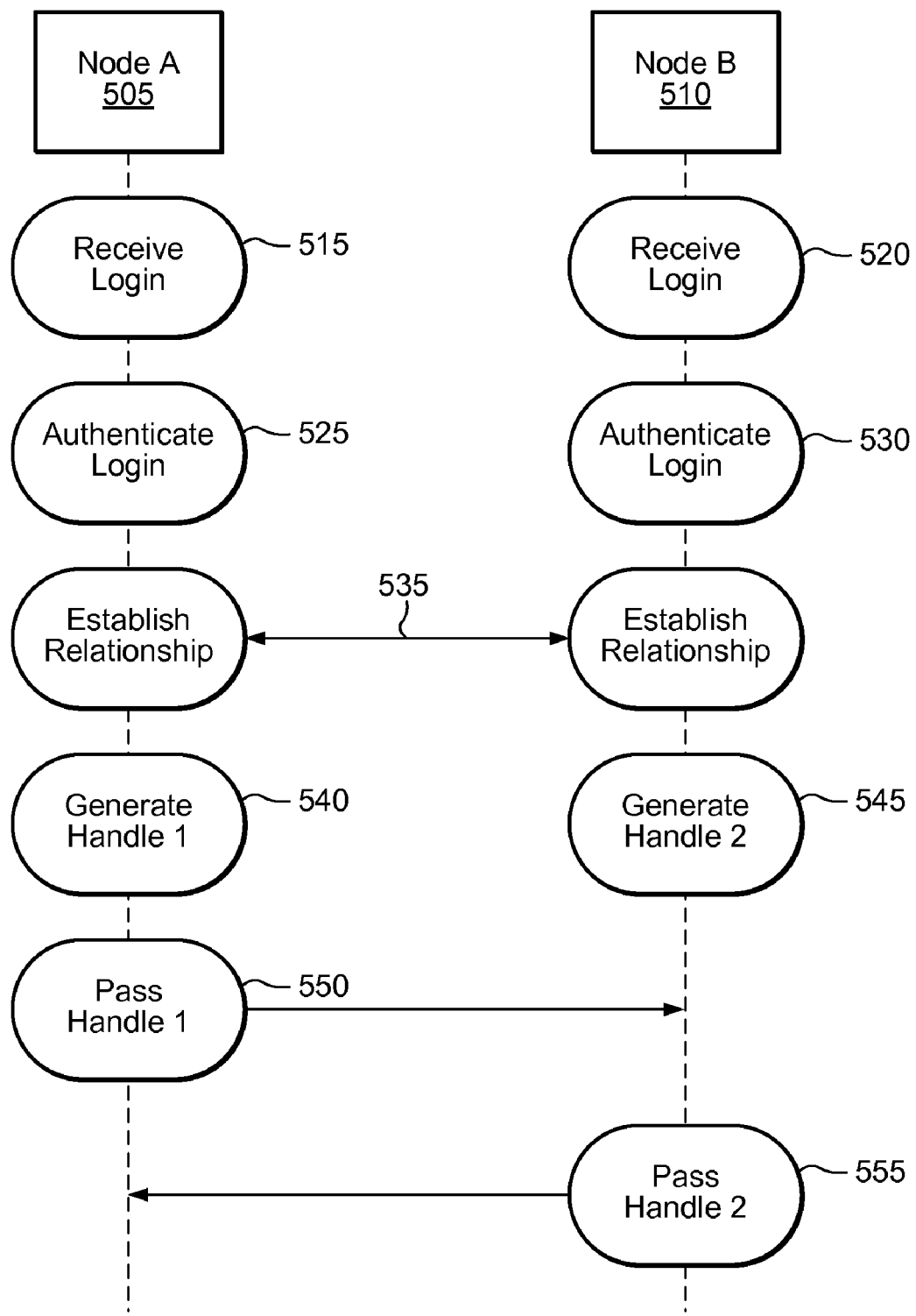
FIG. 5 is an interaction flowchart illustrating an identity federation process.

FIG. 5 is an interaction flowchart illustrating an identity federation process. In an embodiment, the first time a user uses an identity provider to log into a service provider, the user is given the option of linking an existing account on the service provider with the identity provider login in order to preserve existing user profile data under the single sign-on.

According to one embodiment, when linking accounts, the actual account name for a user is not provided and a handle is used for a particular user. It may be advantageous, however, for identity providers to create a single handle for service provides with multiple network addresses so that the handle can be resolved across the network addresses. In an embodiment of a system with multiple identity providers and service providers, there can be a mechanism by which users are (at their discretion) uniquely identified across the providers. Although long chains of identity providers and service providers can be constructed, the user's account is federated in each link in the chain and, therefore, a globally unique name for that user across all of the elements of the chain is not required.

In the illustrated embodiment, a principal's identity at node A 505 is linked with the principal's identity at node B 510. Node A 505 receives a login 515 from an entity such as a user. Likewise, node B 510 receives a login 520. Each of node A 505 and node B 510 authenticates the login 525 and 530 respectively. Next, node A 505 and node B 510 agree to establish a relationship 535 between the nodes. Node A 505 generates a first handle 540 that corresponds to the principal's identity (e.g., a user account) on node A 505. Node B 510 generates a second handle 545 that corresponds to the principal's identity (e.g., a user account) on node B 510. Node A 505 then passes the first handle 550 to node B 510. And node B 510 passes the second handle 555 to node A 505. In this manner, the user directory on node A 505 includes information about the principal's identity on node B 510 and vice versa. Although two handles are illustrated in FIG. 5, one skilled in the art will appreciate that one handle can also be used. One advantage of using two handles is flexibility for each of the nodes to store the handle in a format that it can accommodate.

Figure 6:
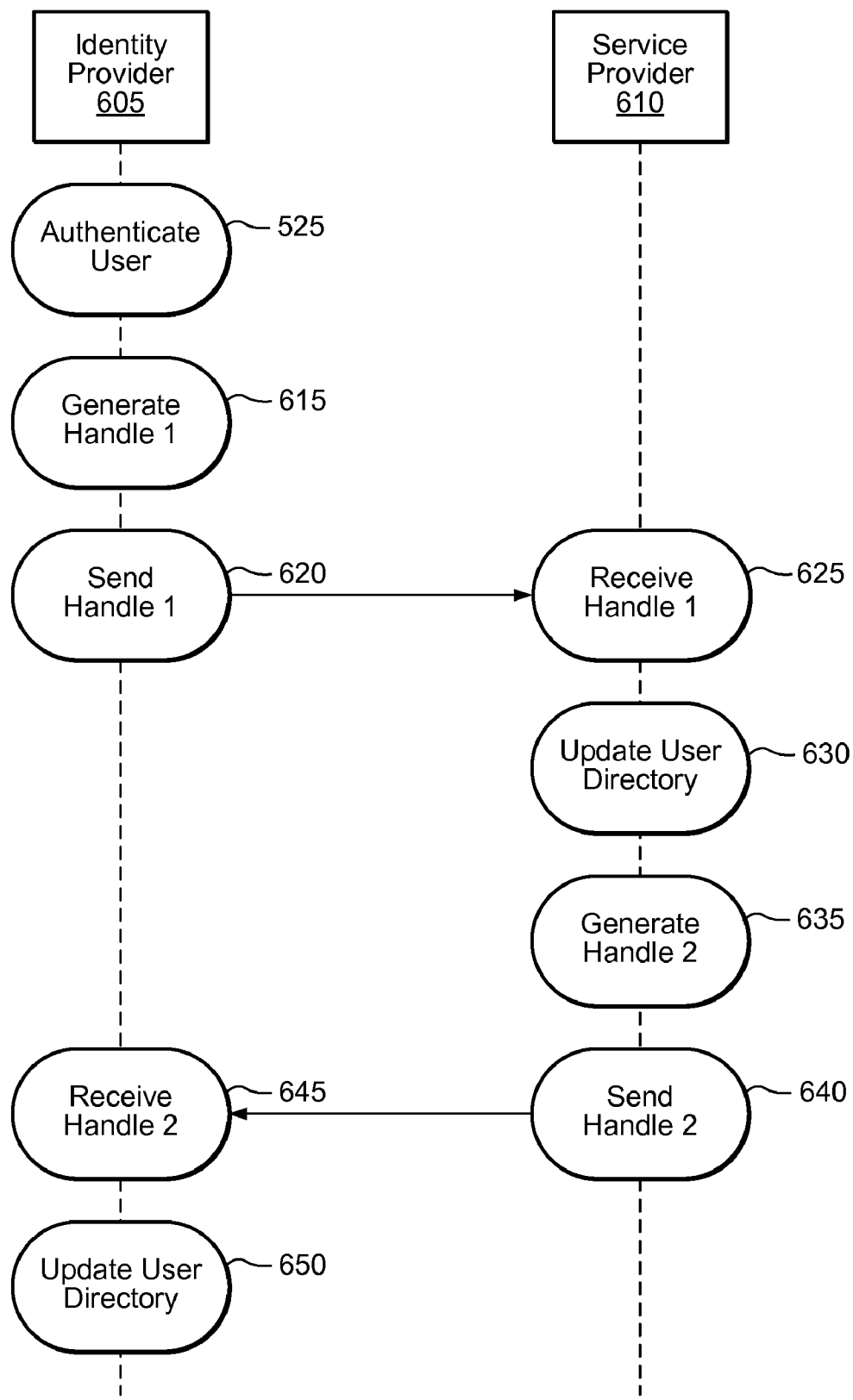
FIG. 6 illustrates further details of identity federation interactions according to one embodiment of the present invention.

FIG. 6 illustrates further details of identity federation interactions according to one embodiment of the present invention. Identity provider 605 and service provider 610 are shown linking or federating a user account. First, identity provider 605 authenticates the user 610. One skilled in the art will appreciate that a user can be authenticated by a variety of non-exclusive methods including presenting a password, a certificate, or biometric data. Next, a first handle is generated 615. In an embodiment, a handle is a pseudonym for the user account name that is dynamically generated to reduce the visibility of the user account name. The first handle is sent 620 to service provider 610. Service provider 610 receives the first handle 625 and updates its user directory 630 to include the first handle. In the illustrated embodiment, service provider 610 generates a second handle 635. The second handle is sent 640 to identity provider 605. Identity provider 605 then receives the second handle 645 and updates its user directory 650 to include the second handle. Further details of user directories are described below and with reference to FIGS. 7-11. In another embodiment, a single bidirectional handle is used. That is, the identity provider 605 and the service provider 610 share one handle for the user. In this implementation, the interactions illustrated as steps 635, 640, and 645 are not performed and the user directories 630, 650 include the shared handle.

An explicit trust chain is created when a user invokes account linking between a service provider and an identity provider. Users are able to manage these federation links by setting user policies and preferences, as well as discarding links. While multiple accounts can be linked to each other, there is an explicit link between each account. In an embodiment, providers cannot skip over each other in the trust chain to request information or services for a user because user profile information is checked at each step. Further, in an embodiment, user account handles cannot be resolved across more than two elements of trust chain. That is, when two elements of a trust chain communicate, they can differentiate a user by handle. However, in additional embodiments, transitive trust can be achieved by issuing tickets for use at other providers.

Service delegation is described below in additional detail.

Figure 7:
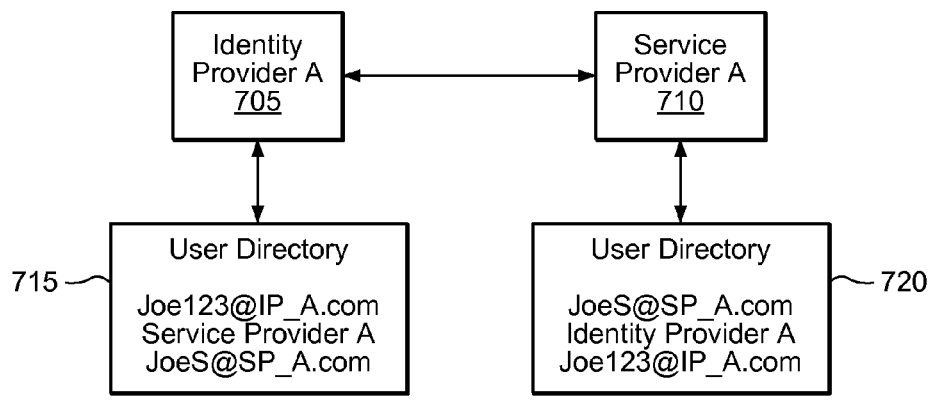
FIG. 7 illustrates account linking for an identity provider and a service provider.

FIG. 7 illustrates account linking for an identity provider and a service provider. Because both identity provider A 705 and service provider A 710 need to remember the other's handle for the user, they create entries in their user directories for each other and note each other's handle for the user. As described above, in an embodiment of the present invention, identity provider A 705 and service provider A 710 share a handle for the user. For clarity of illustration, account names are shown rather than handles. Identity provider A 705 and service provider A 710 have linked a user account for an exemplary user named "Joseph Smith." In user directory 715 for identity provider A 705, it is noted that "Joe123" is known as "JoeS" at service provider A 710. Reciprocally, in user directory 720 for service provider A 710, it is noted that "JoeS" is known as "Joe123" at identity provider A 705.

Figure 8:
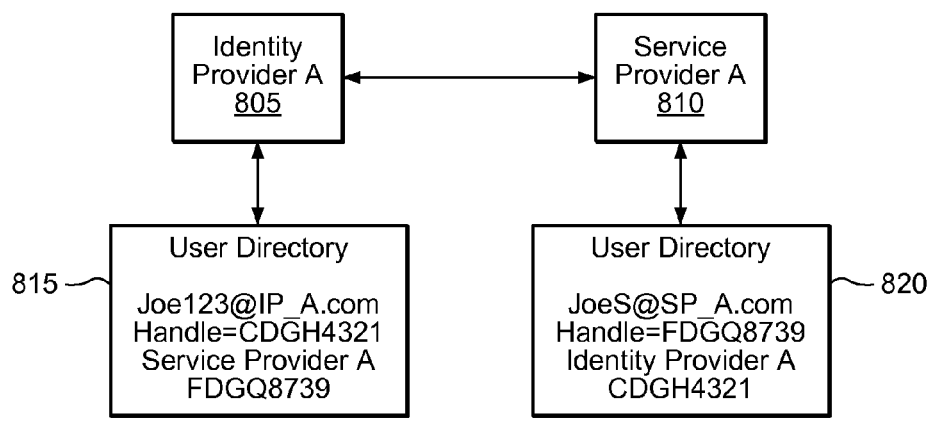
FIG. 8 illustrates account linking using handles.

FIG. 8 illustrates account linking using handles. Although similar to FIG. 7 in linkage relationship, FIG. 8 illustrates how handles are used. In user directory 815 for identity provider A 805, it is noted that "Joe123" corresponds to a handle of "CDGH4321." In user directory 820 for service provider A 810, it is noted that "JoeS" corresponds to a handle of "FDGQ8739." Also shown is the result of the above-described handle exchange. That is, each of identity provider A 805 and service provider A 810 stores the other's handle for the user.

Figure 9:
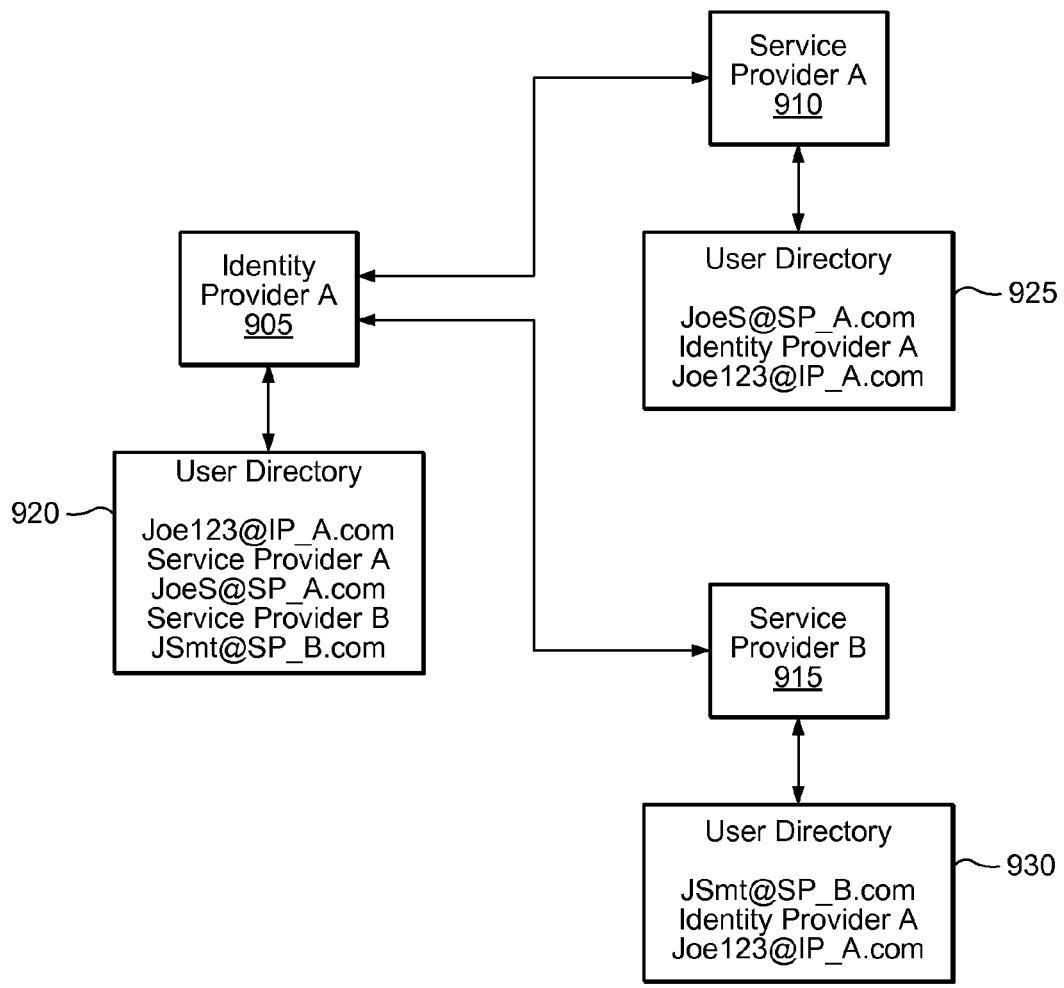
FIG. 9 illustrates account linking for an identity provider and multiple service providers.

FIG. 9 illustrates account linking for an identity provider and multiple service providers. Identity provider A 905 is linked with service provider A 910 and service provider B 915. User directory 920 for identity provider A 905 illustrates how multiple service provider accounts are linked. User directory 925 corresponds to service provider A 910, and user directory 930 corresponds to service provider B 915. This configuration allows a user to authenticate with multiple service providers 910, 915 using identity provider A 905. For clarity of illustration, account names are shown rather than handles. In an embodiment, one or more handles are used to reduce the visibility of account names within the trust chain. Each handle is a dynamically generated, strong random identifier serving as a name for the principal in the namespace between the identity provider and the service provider. In further embodiments, one or more handles can be periodically regenerated throughout the trust chain to further reduce the possibility of collusion or breach of user policy or privacy preferences.

Figure 10:
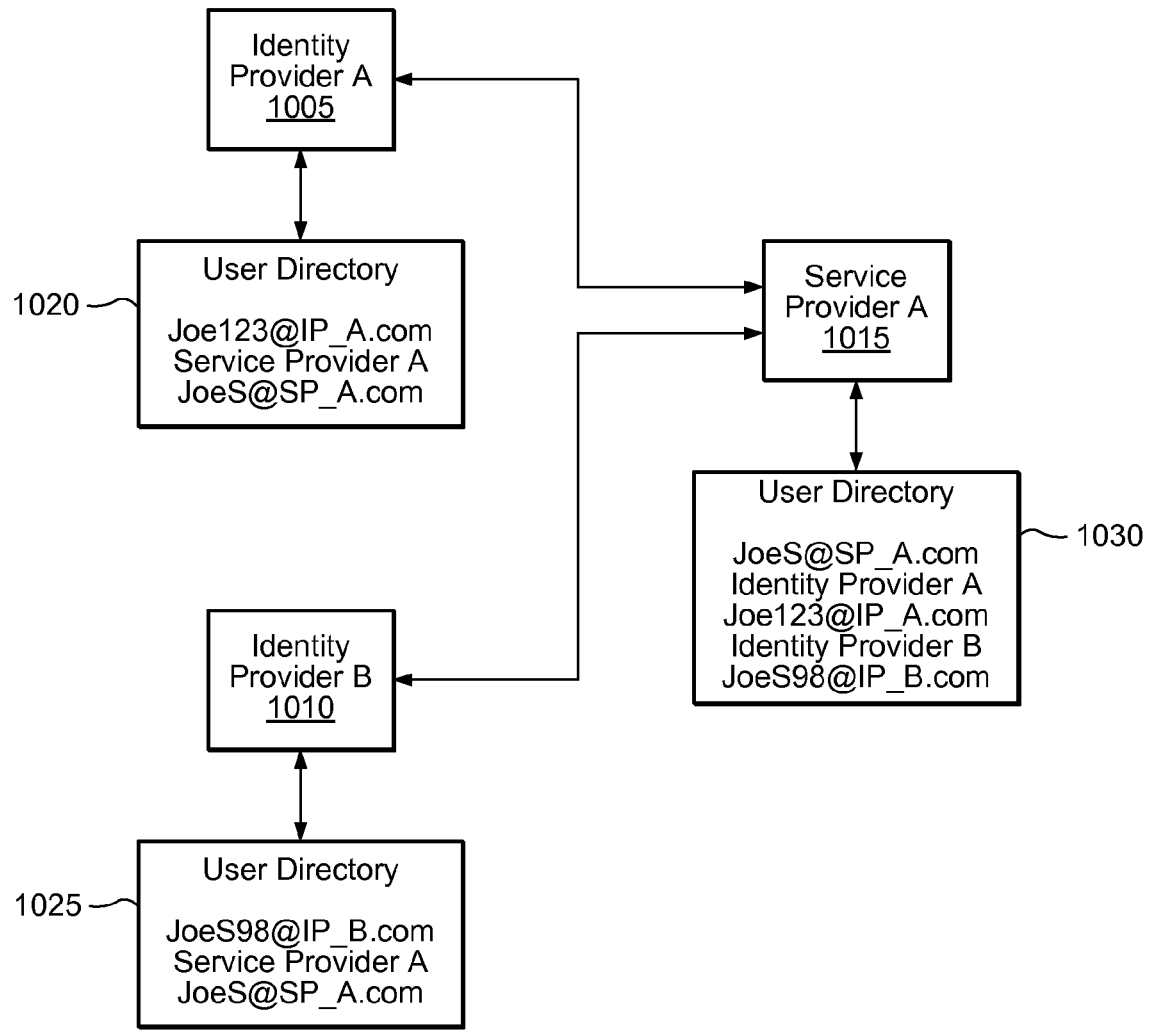
FIG. 10 illustrates account linking for multiple identity providers and a service provider.

FIG. 10 illustrates account linking for multiple identity providers and a service provider. Identity provider A 1005 and identity provider B 1010 are linked with service provider A 1015. This configuration allows a user to use multiple identity providers 1005, 1010 to authenticate a user for a service provider 1015. In this example, user directory 1020 corresponds to identity provider A 1005, user directory 1025 corresponds to identity provider B 1010, and user directory 1030 corresponds to service provider A 1015. An advantage of this arrangement is additional flexibility when switching between computing devices. Examples include switching from a work computer to a home computer, or from a personal computer to a mobile device. A user may wish to distribute identity information among identity providers and associate the identity providers with distinct computing devices. For example, a user can trust her employer to be an identity provider for a work-related computing device. When the user switches computing devices, the user's profile data is available to service providers linked with the particular identity provider.

Figure 11:
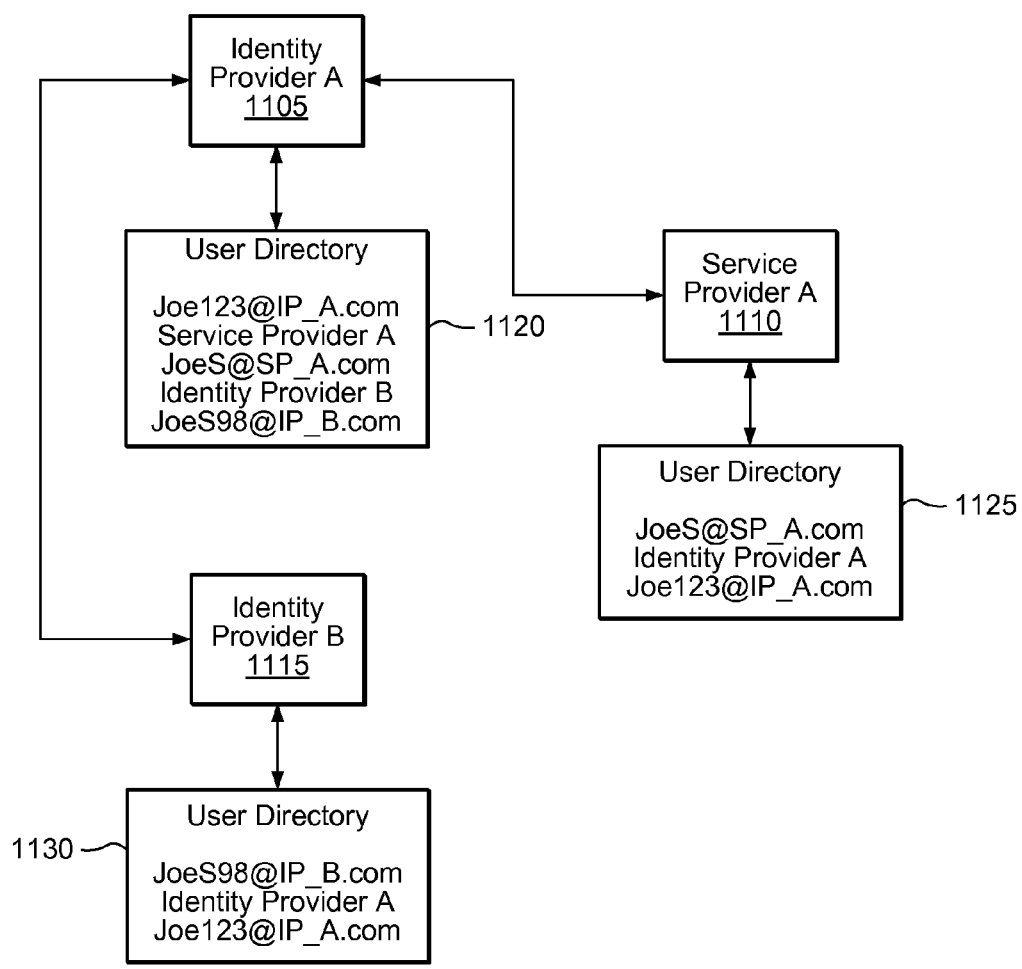
FIG. 11 illustrates linking of multiple identity providers.

FIG. 11 illustrates linking of multiple identity providers. In a further embodiment, a trust chain includes identity provider links. Identity provider A 1105 and service provider A 1110 are linked. Identity provider A 1105 and identity provider B 1115 are also linked. User directory 1120 corresponds to identity provider A 1105, user directory 1125 corresponds to service provider A 1110, and user directory 1130 corresponds to identity provider B 1115. Identity provider links enable a user to log into service provider A 1110 using identity provider A 1105 as a preferred identity provider, but also have a choice of using identity provider B 1115. The user can link identity provider A 1105 and identity provider B 1115 together and set policies that enable the identity providers to access each other's information. In this manner, a user does not have to remember to create explicit links between multiple identity providers and multiple service providers.

FIG. 12 illustrates a service provider user interface. An exemplary service provider login interface is shown. A user is given an option of local password-based authentication 1205 or authentication via an identity provider 1210. In this embodiment, the user is requested to select an identity provider from a predefined selection 1215. One skilled in the art will appreciate that many selection methods can be readily used, such as entering an identity provider host name or other network address. Upon selecting the identity provider login button 1220, the user is redirected to the chosen identity provider for authentication.

FIG. 13 illustrates an identity provider user interface. An exemplary identity provider login interface is shown. Upon redirection from a service provider or if a user directly accesses the identity provider, the user is requested to enter user name 1305 and password 1310. In one embodiment, if the user was previously redirected to the identity provider from a service provider, the identity provider redirects the user back to the service provider after a successful authentication. If, however, a user is directly accessing the identity provider for account maintenance, such as managing federated links or setting user policies, redirection does not occur. Rather, the identity provider displays an account management interface or control panel.

Figure 14:
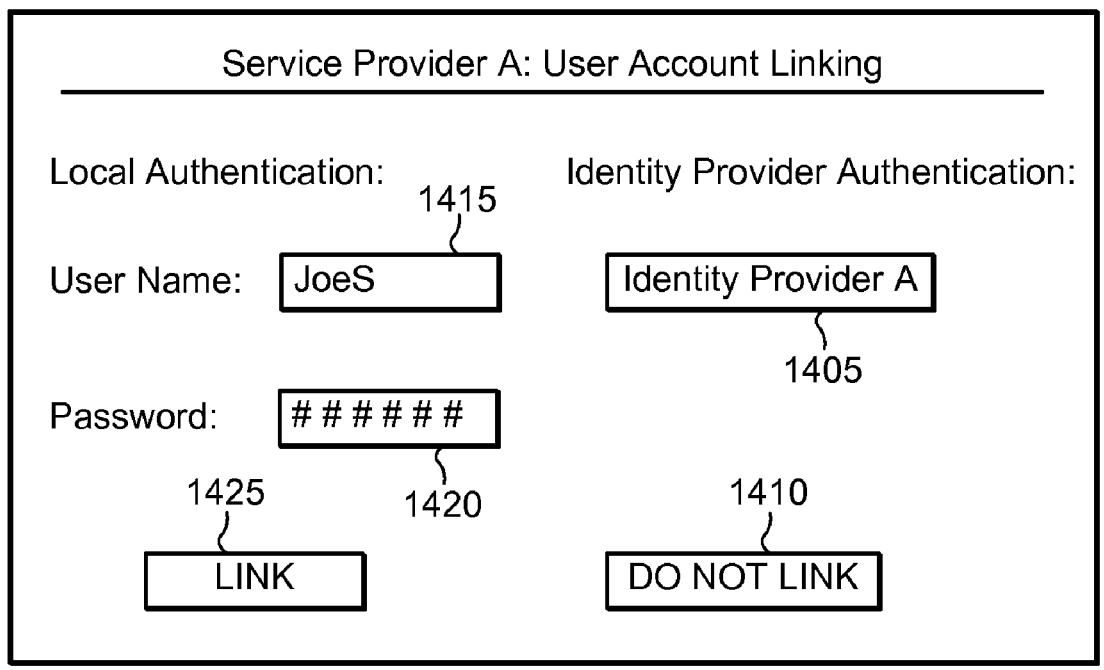
FIG. 14 illustrates a user interface for account linking.

FIG. 14 illustrates a user interface for account linking. An exemplary service provider account linking interface is shown. In an embodiment, when a user is authenticated by an identity provider and redirected to the service provider, the service provider can prompt the user to link the service provider account with the authenticating identity provider 1405 to preserve existing user profile data under the single sign-on. If the user does not want to link accounts, the user can select do not link 1410 to continue to access authorized services. If the user does want to link the accounts, the user enters a local user name 1415 and password 1420 and selects link 1425. The service provider and identity provider then use back channel communications to exchange user profile data and update user directories accordingly.

1. User Scenarios

The following description includes further examples of how a federated network identity is used.

a) Establishing a New Network Identity with a Primary Identity Provider

The user browses to the user's network identity provider of choice and clicks on "Create Network Identity." The user is prompted if the user is a new network identity user or an existing network identity user. The user clicks on the new network identity option. The user then chooses a username and password. The user clicks "Submit" to create the identity. If successful, the user is then optionally prompted to enter personal information that could be shared with other network identity provider-enabled websites. In one embodiment, this includes any information the identity provider wishes to collect about the user with the user's explicit permission. This could include more than just the user's name and address information. In another embodiment, the identity provider may collect information without the user's explicit permission or with the user's implicit permission.

b) Establishing Accounts with Multiple Identity Providers

The user browses to another network identity provider, the user's health care provider and clicks on "Create Network Identity." The user is prompted if the user is a new network identity user or an existing network identity user. The user clicks on the existing network identity option. The user is then prompted for the user's existing network identity username. Upon entering the username, the user's browser is redirected to the user's primary identity provider where the user is prompted to enter the user's password to verify the user's identity. Once the user's identity is verified the user is redirected to the referring healthcare site, where a new account using the user's primary network identity is created for the user. The user is then prompted to enter optional personal information that could be shared with other network identity-enabled websites. In one embodiment, this includes any information the identity provider uses to collect about the user with the user's explicit permission. This includes information about the user's medical history, the user's blood type, the user's current medication, and the user's emergency contact information. In another embodiment, the identity provider may collect information without the user's explicit permission or with the user's implicit permission. Once completed, a new account is created at the healthcare provider using the user's existing network identity.

The user then decides to create a personal calendar online. The user browses to the user's favorite calendar service provider and creates an account linking to the user's primary network identity as the user did with the health care provider. Here the user creates a calendar and enters in appointments for the next three months. This provider also provides e-mail and address book services. The user creates a new e-mail account and also enters address book entries online.

The user then creates accounts with other network identity providers, one with a broker, one with a bank, and one with a home security system provider. At each provider, the user provides the information relevant only to that provider. In one embodiment, the user is able to access and to aggregate the information from these providers, but only with the user's explicit permission. In another embodiment, the user is able to access and to aggregate the information from these providers without the user's explicit permission or with the user's implicit permission.

c) Not Logged into a Network Identity and Browsing to a Network Identity-Enabled Website The user browses to a network identity-enabled merchant website. The user clicks on the "Sign-in" link. The user is redirected to the user's primary identity provider's web site, specifically to a login page prompting for a username and password. The user enters the username and password and clicks "Submit." The user's browser is then redirected to the original network identity-enabled merchant the user visited, and the website automatically recognizes the user as the user browses through any portion of the merchant's website.

According to embodiments of the present invention, single sign-on redirection uses parameter passing, form post, or cookies as described above.

d) Not Logged into a Network Identity and Browsing to One of the Identity Provider Websites where User has Created an Account The user browses to the user's health care provider website. The user click on the "Sign-in" link. The user is redirected to the user's primary identity provider, specifically to a login page prompting for a username and password. The user enters the username and password and clicks "Submit." The user's browser is then redirected back to the health care provider's website, which now recognizes the user. The user can now view and modify health care information. The user cannot view or modify information stored with other identity providers because the health care provider is not linked to identity providers that have that information.

e) Logged into a Network Identity and Browsing to a Network Identity-Enabled Website The user browses to a network identity-enabled merchant website the user has not been to during the user's current session (i.e., since the last time the user signed in to an identity provider). The website does not immediately recognize the user. The user clicks on the single sign-on "Sign-in" link. After browser redirections requiring no interaction from the user, the user is now "logged into" the merchant website and the website automatically recognizes the user as the user browses through any portion of the merchant's website.

f) Aggregating Information from Multiple Identity Providers into a Single Virtual Identity The user wishes to view all the user's identity information in one place. The user would like to be able to view the user's bank balance and stock portfolios at the same time so the user can make decisions on buying or selling stock and transferring money from the user's bank to the user's broker. At the same time, the user has monthly payments to make for a mortgage, a car, and a phone bill. The user would like to view the user's calendar to be able to see when each bill is due and its amount, as well as when the user receives his next paycheck. Combining this information in a single source allows the user to make financial decisions quickly and to schedule transactions such as bank transfers.

The user browses to a portal that allows the user to aggregate the user's information from across all the user's identity providers and provides the above-described services. The user signs into this portal using a network identity. The user then tells the portal about each identity provider with which the user has an account. Alternatively, this information could be automatically retrieved from the user's primary network identity provider. The portal then redirects the user to a calendar service website where the user is asked to authorize sharing of the information with the portal. The user authorizes the portal to access the calendar (e.g., by re-entering the user's password at the calendar website.) These steps are repeated for the user's bank and the user's broker. Once this process is completed, the portal displays the user's calendar, bank, and stock portfolio information on a single page. The user can later disable the portal's access to the user's information by visiting the identity providers' websites and explicitly revoking the permissions for the portal to access that information. Additionally, the user can configure an automatic expiration time or timeout to disable the portal's access to distributed user profile data. Whenever a user exits the browser any cookies or cached data is destroyed.

g) Managing Identity Information and Access Rights

When the user authorized the portal to access information from the user's bank, the bank explicitly authorized the portal do so. For the user's convenience, the user would not have to grant access every time the user logs into the user's portal. The user's identity provider, in this case the bank, remembers that the user granted access to the portal. The user now wants to disable the portal's access to the bank information. The user logs into the bank's website with the user's network identity and clicks on "Manage Account." Here the user can view everyone who has access to the banking information. The user sees that the user has granted access to the portal. The user clicks a selection box next to the portal's name, and clicks on the "Revoke Access" button. The portal can now no longer access the user's banking information.

D. Single Logout

Figure 15:
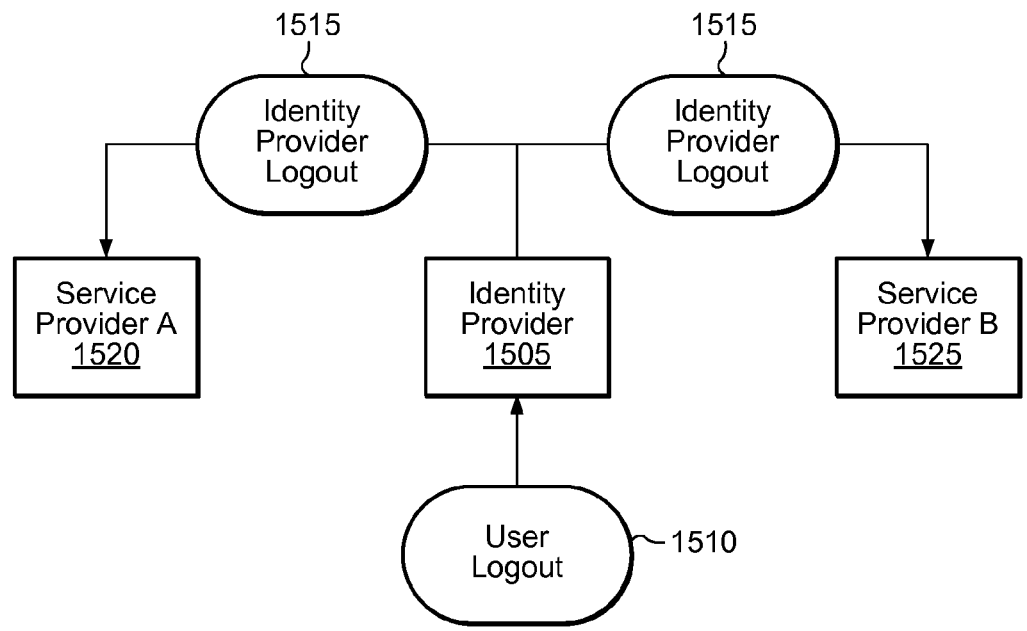
FIG. 15 is a message flow diagram of a single logout embodiment.

FIG. 15 is a message flow diagram of a single logout embodiment. According to an embodiment of the present invention, when a user logs out from an identity provider, all service providers that are relying on the identity provider login are automatically logged out as well. Identity provider 1505 receives a user logout message 1510. Identity provider 1505 then sends an identity provider logout message 1515 to each service provider that authenticated the user using identity provider 1505. In the illustrated embodiment, an identity provider logout message 1515 is sent to service provider A 1520 and service provider B 1525 because these service providers are actively authenticated in the current session. One skilled in the art will recognize that SOAP and other messaging protocols can be used to implement the described logout feature.

Figure 16:
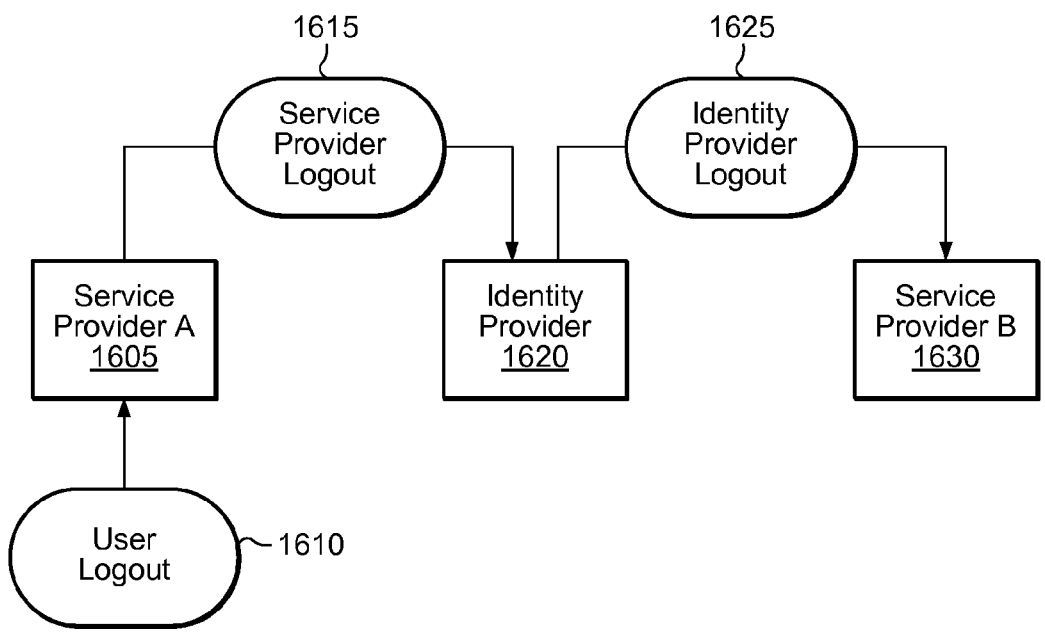
FIG. 16 is a message flow diagram of a further single logout embodiment.

FIG. 16 is a message flow diagram of a further single logout embodiment. According another embodiment, service provider A 1605 receives a user logout message 1610. When a user logs out at a service provider, the user can indicate whether the logout is global for all authenticated system entities or local to the service provider only. In an embodiment, a user policy or preference is used to determine whether logout message 1610 is global or local. In another embodiment, the user selects an appropriate logout access point depending on whether the user intends to logout globally or locally. In the case of a global logout, service provider A 1605 sends a service provider logout message 1615 to identity provider 1620. Then, in turn, identity provider 1620 sends an identity provider logout message 1625 to service provider B 1630 to log the user out of service provider B 1630, which completes the global logout.

E. Single Sign-on with Next Generation Clients

Figure 17:
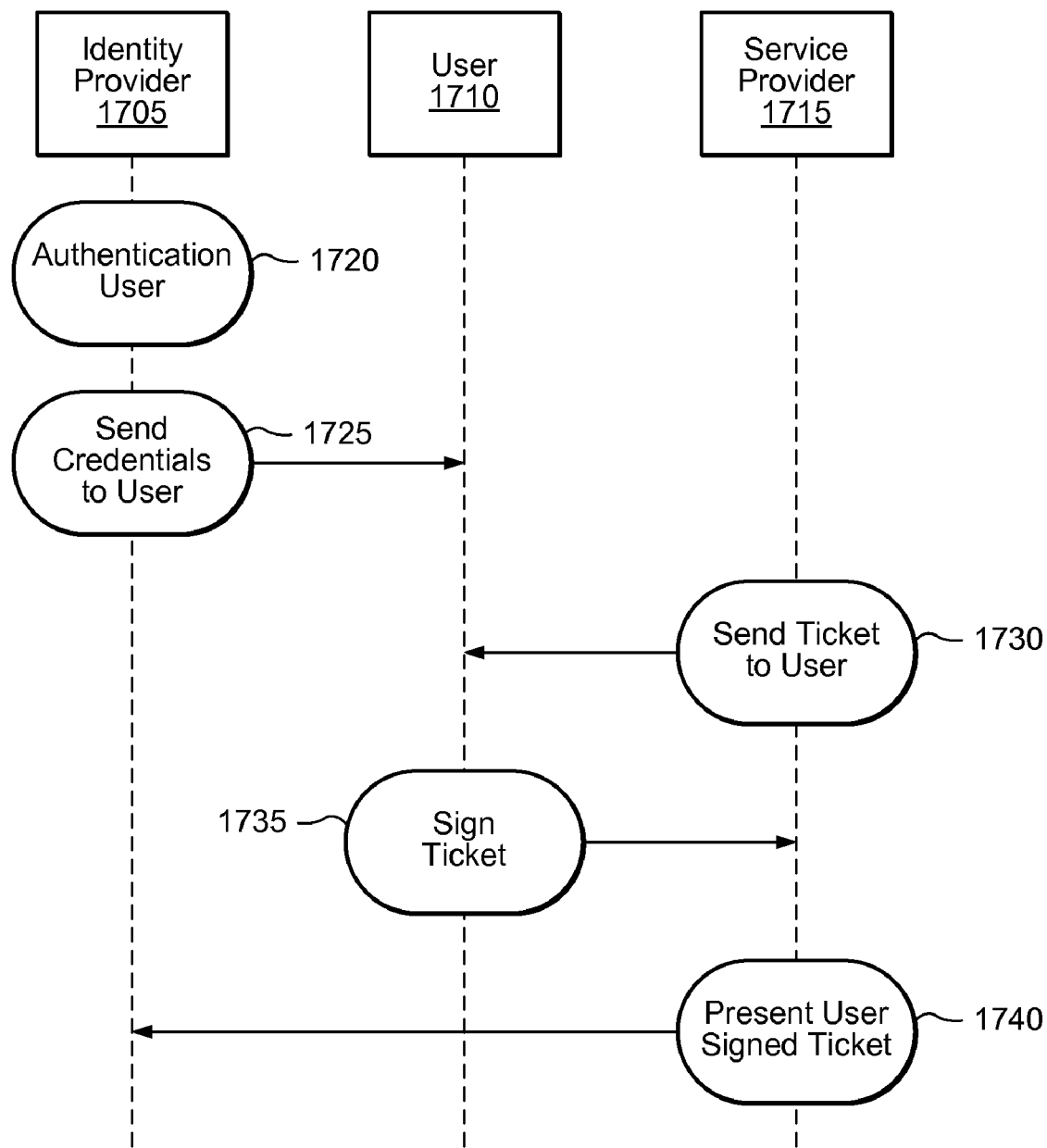
FIG. 17 is an interaction flowchart illustrating a single sign-on embodiment including a user-signed ticket.

FIG. 17 is an interaction flowchart illustrating a single sign-on embodiment including a user-signed ticket. Identity provider 1705, user 1710, and service provider 1715 are illustrated. While the HTTP redirect mechanism described herein achieves single sign-on for existing web infrastructure, intelligent devices such as advanced mobile handsets, next generation browsers, and browsers with native extensions have the capability to accept credentials or certificates from an identity provider, present those credentials or certificates to a service provider, and also digitally sign service tickets. In embodiments of this architecture, service tickets can be electronically signed and credentials can be presented to a service provider using a dedicated mechanism rather than an HTTP redirect. Further details of service tickets are described below.

The illustrated process begins with identity provider 1705 authenticating a user 1720. Next, identity provider 1705 sends credentials 1725 to user 1710. Service provider 1715 sends a service ticket 1730 to user 1710. User 1710 then digitally signs the service ticket 1735 and returns it to service provider 1715. Service provider 1715 presents the user signed ticket 1740 to identity provider 1705 to complete the authentication.

Figure 18:
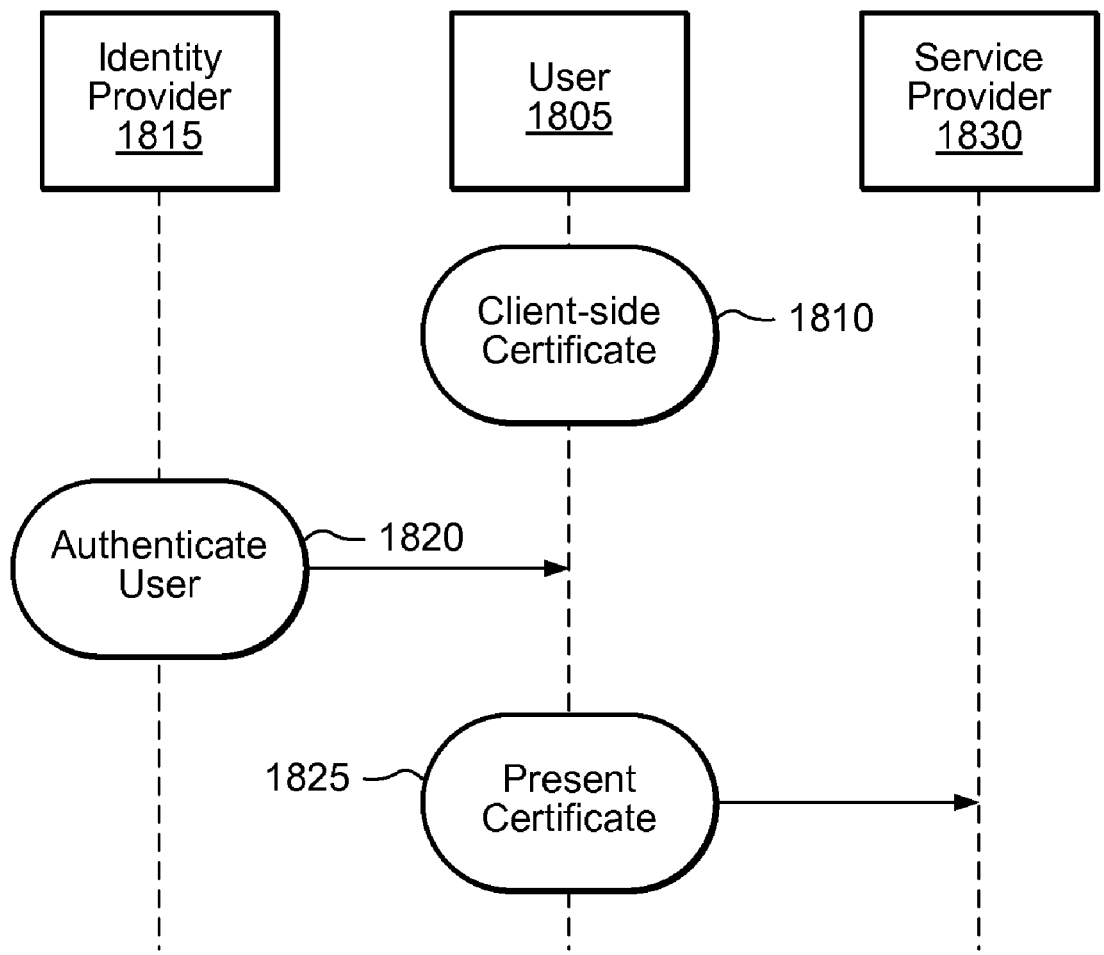
FIG. 18 is an interaction flowchart illustrating a single sign-on embodiment including a client-side certificate.

FIG. 18 is an interaction flowchart illustrating a single sign-on embodiment including a client-side certificate. Another embodiment includes smart clients using client-side certificates issued by a trusted certification authority (CA). In a single sign-on embodiment, user 1805 presents a client-side certificate 1810 to identity provider 1815. Identity provider 1815 then authenticates the user 1820 using both client-side and server-side encryption. Next, user 1805 presents the authenticated certificate 1825 to service provider 1830. Because current browsers have limited support for client-side certificates, intelligent devices and business-to-business transactions are examples of applicable embodiments of certificate-based single sign-on. Intelligent devices and browser extensions can securely store personal information including user attributes. When using such a device, authenticated users can store and/or replicate data in a client and automatically "form fill" the data to a service provider. Protocols such as SyncML and Electronic Commerce Modeling Language (ECML) address replicating data to an intelligent client.

1. Credentials and Authentication Level

Credentials are relied upon in a number of ways in a single sign-on architecture and are often the basis for establishing trust with the credential bearer (principal). Credentials can represent security-related attributes of the owner's identity. Sensitive credentials that require special protection, such as private cryptographic keys, are protected from unauthorized exposure. Some credentials are intended to be shared, such as public key certificates. As described above, credentials are a general notion of the data necessary to prove an assertion. For example, in a password-based authentication system, the username and password can be considered credentials. However, the use of credentials is not limited to authentication. In an embodiment, credentials are also relied upon in the course of making an authorization decision.

As described above, in an embodiment, certain credentials are kept confidential. However some credentials not only need to remain confidential but also should be integrity protected so as to prevent them from being tampered with or falsified. Other credentials, such as the transient tokens described below, are a nonce.

In an embodiment, credentials include an authentication level that indicates the quality of the credential. Credentials used to authenticate a principal or supplied to authorize a transaction may not be of sufficient quality to complete the transaction. For example, a principal initially authenticates to the identity provider using a username and a password. The principal then attempts to conduct a transaction, for instance a bank withdrawal, which requires a stronger form of authentication. In this case the principal presents a stronger assertion of his identity, such as a public key certificate. The quality of the credential required to authenticate or to authorize a particular transaction or resource use is generally service provider policy decision. In an embodiment, the service provider has sole discretion to enforce this policy. The service provider can reject the credential for other reasons as well. For example it may be the policy of a service provider to require that all protocol exchanges between it and the bearer of a credential occur over a communications protocol that has certain qualities, such as bilateral authentication, integrity protection, and message confidentiality.

F. Web Services Architecture

1. Communication

Embodiments of the invention use web services to provide a service to a program rather than a natural person. Web services present functionality in a way that is convenient for programs executing on various computing device and platforms to consume. One mechanism for such interoperation is Simple Object Access Protocol (SOAP) over HTTP. In an embodiment, the methods for services are specified with Web Services Description Language (WSDL), so identity and service providers need not host Universal Description, Discovery and Integration (UDDI) servers unless the providers make additional services available. UDDI is a specification for distributed web-based information registries of web services. Table 3 illustrates the contents of an example SOAP call. Table 4 illustrates the contents of an example SOAP response.

TABLE 3

An Example SOAP Call

```
<SOAP-ENV:Envelope>
    <SOAP-ENV:Body>
        <xmlns:m="http://www.stock.org/stock" />
        <m:GetStockPrice>
        <StockName>SUNW</StockName>
        </m:GetStockPrice>
    </SOAP-ENV:Body>
</SOAP-ENV:Envelope>
```

TABLE 4

An Example SOAP Response

```
<SOAP-ENV:Envelope>
    <SOAP-ENV:Body>
        <xmlns:m="http://www.stock.org/stock" />
        <m:GetStockPriceResponse>
        <Price>34.5</Price>
        </m:GetStockPriceResponse>
    </SOAP-ENV:Body>
</SOAP-ENV:Envelope>
```

2. Service Types

In an embodiment, schemas for popular services are specified using commonly accepted schemas such as those from OASIS. Such services include: basic identity (address, e-mail, phone number), wallet, calendar, portfolio, address book, and instant message. One skilled in the art will recognize that other data structures can be used to implement various attributes of user profile data. In a web services embodiment, each of these services is accessible by a set of SOAP calls as specified in WSDL and using standard XML schemas. Additional protocols such as iCal, ICAP, and Web-DAV can be implemented.

One skilled in the art will appreciate that a specific version of a protocol and profile or subset of that protocol are used within a web services architecture for interoperability purposes. It should be understood that various identity providers and service providers can extend schemas in many ways to store additional information. Once that information is federated, however, it should be done using an endorsed schema to prevent subtly different schemas from propagating across system entities.

3. Static and Dynamic Data

The web services architecture supports both static and dynamic data. An example of static data is a basic identity service that returns an e-mail address, while dynamic data could be represented by a calendar service returning calendar entries. From the web service perspective, both of these types of services are treated the same in that they are both accessible via SOAP over HTTP calls, defined by WSDL descriptions, and use schemas that system entities have agreed upon. In some embodiments, schemas append a lifespan to particular data. For example, a portfolio service could return stock quotes with a 15 second lifespan while the market is open, an 18-hour lifespan when the market is closed overnight, and a two-day lifespan when the market is closed for the weekend.

4. Service Delegation

Figure 19:
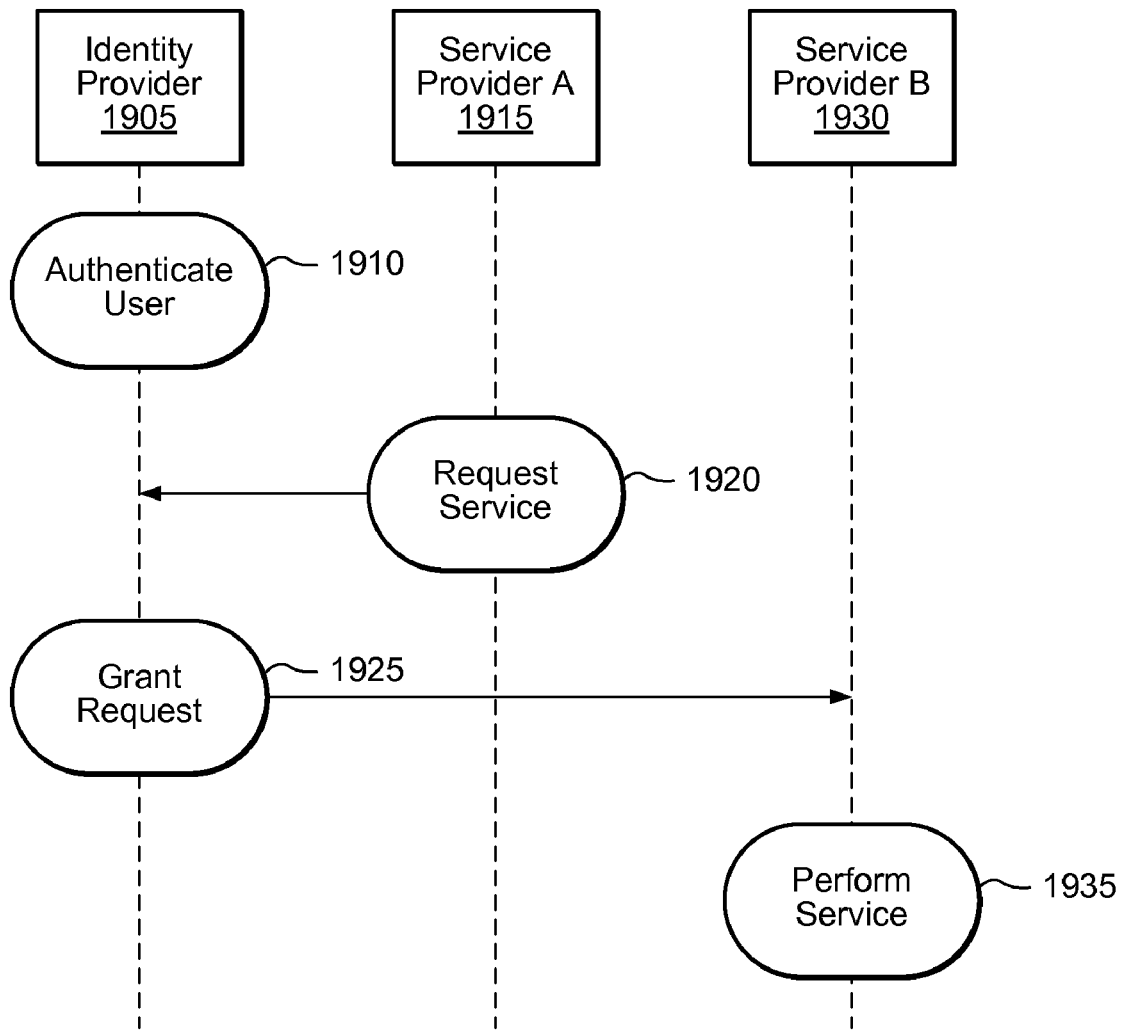
FIG. 19 is an interaction flowchart illustrating service delegation using an identity provider as a gateway.

FIG. 19 is an interaction flowchart illustrating service delegation using an identity provider as a gateway. Service delegation is the offering of resources and services by some owning entity to other entities on the network. The other entities typically access and mutate these resources and services under the permissions of and for the benefit of the owning entity. User profile data stored by an identity provider can include delegate services. Service providers that are accessible to other service providers via an identity provider (i.e., a federated trust chain) can provide delegate services. For example, a user could specify in a primary identity provider a mobile phone serviced by a mobile operator. When other service providers need to send the user a Short Message Service (SMS) message, they can contact the identity provider as a gateway to send the message.

In the illustrated embodiment, identity provider 1905 authenticates user 1910. User triggers service provider A 1915 to request a service 1920 from identity provider 1905. If the requested service or resource is available and authorized for the user, identity provider 1905 grants the request 1925 by sending a message to service provider B 1930, which hosts the requested service. Service provider B 1930 then performs the requested service 1935.

Figure 20:
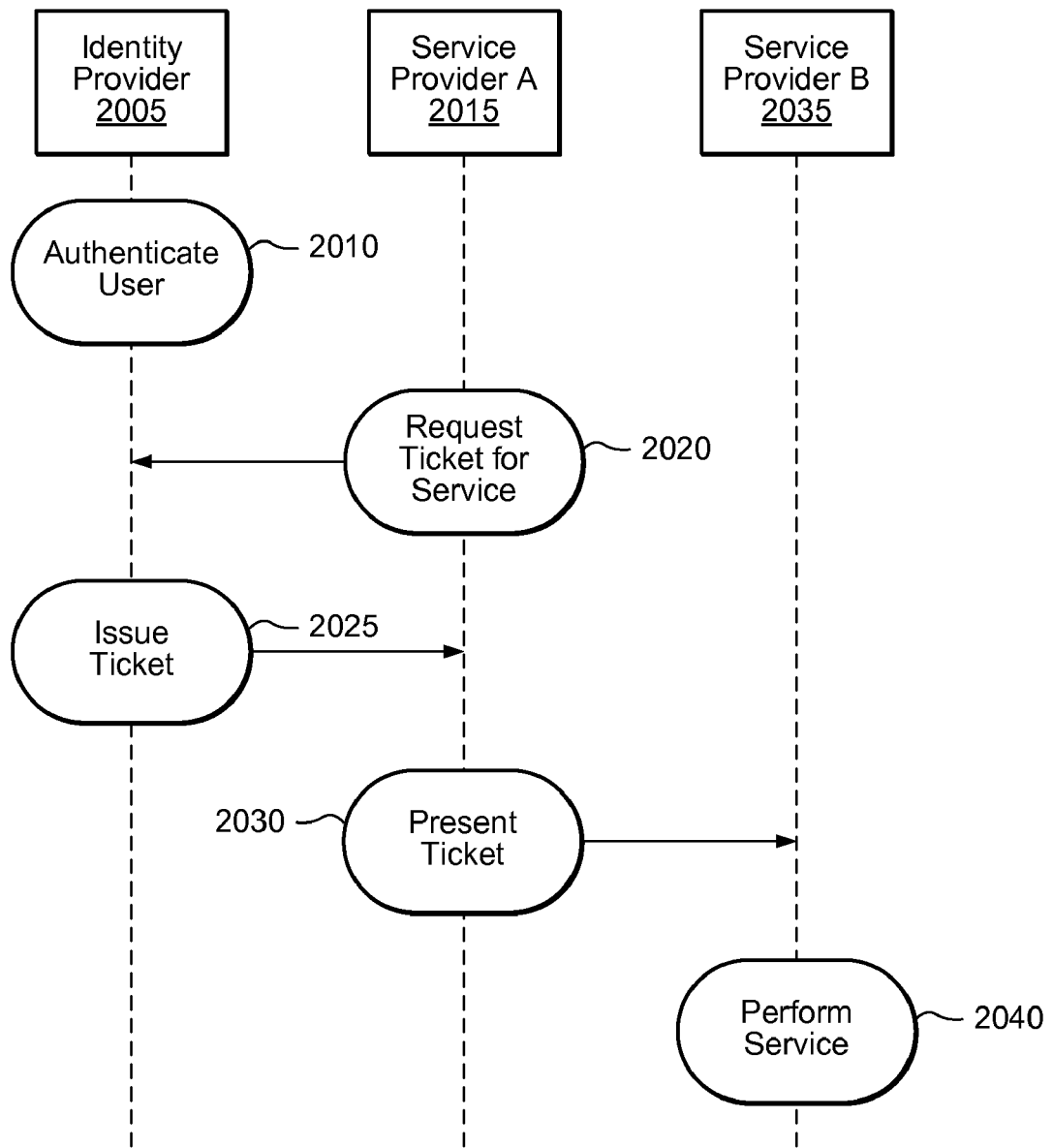
FIG. 20 is an interaction flowchart illustrating service delegation using an identity provider as a directory.

FIG. 20 is an interaction flowchart illustrating service delegation using an identity provider as a directory. In another delegate services embodiment, service tickets are implemented so that identity provider 2005 functions as a service directory for service providers. In this embodiment, identity provider 2005 first authenticates the user 2010. Service provider A 2015 requests a service ticket 2020 for a particular service, such as SMS messaging. Identity provider 2005 issues the ticket 2025 for use a service provider B 2035, which is in this example is the user's SMS service provider. Service provider A 2015 presents the ticket 2030 to service provider B 2035. The service ticket authorizes service provider B 2035 to perform the service 2040.

5. Wallet Services

Figure 21:
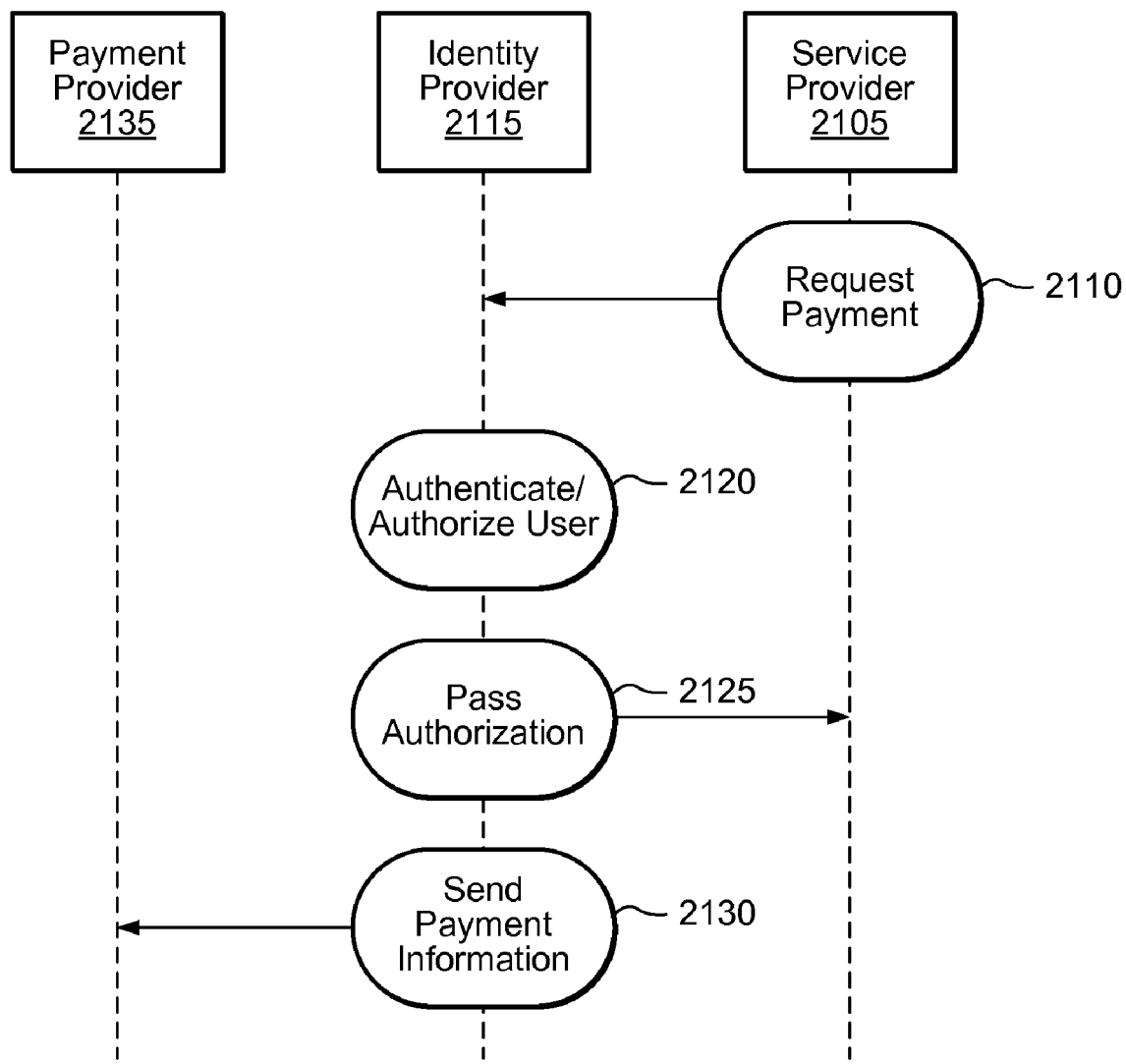
FIG. 21 is an interaction flowchart illustrating a wallet service hosted by an identity provider.

FIG. 21 is an interaction flowchart illustrating a wallet service hosted by an identity provider. When a service provider (e.g., a web-based merchant) processes payments, the service provider can rely on the identity provider to authenticate users and to provide payment information for processing. When sharing information with the service provider, the identity provider receives authorization from the user and passes shipping and billing information to the service provider. Users can authorize an identity provider to share payment information with the service provider or request that payment information be kept hidden.

When the payment information is kept hidden, an identity provider sends the payment information directly to a payment provider and can also generate a one-time credit card number for the payment provider. More specifically, in the illustrated embodiment, service provider 2105 requests payment 2110 from identity provider 2115. Identity provider 2115 authenticates the user and authorizes the purchase 2120. Identity provider 2115 then passes an authorization 2125 to service provider 2105. This authorization includes, for example, an authorization to ship goods and the shipping address. Identity provider 2115 then sends payment information 2130 to payment provider 2135. Payment information 2130 includes, for example, a credit card number stored as part of the user profile data.

Figure 22:
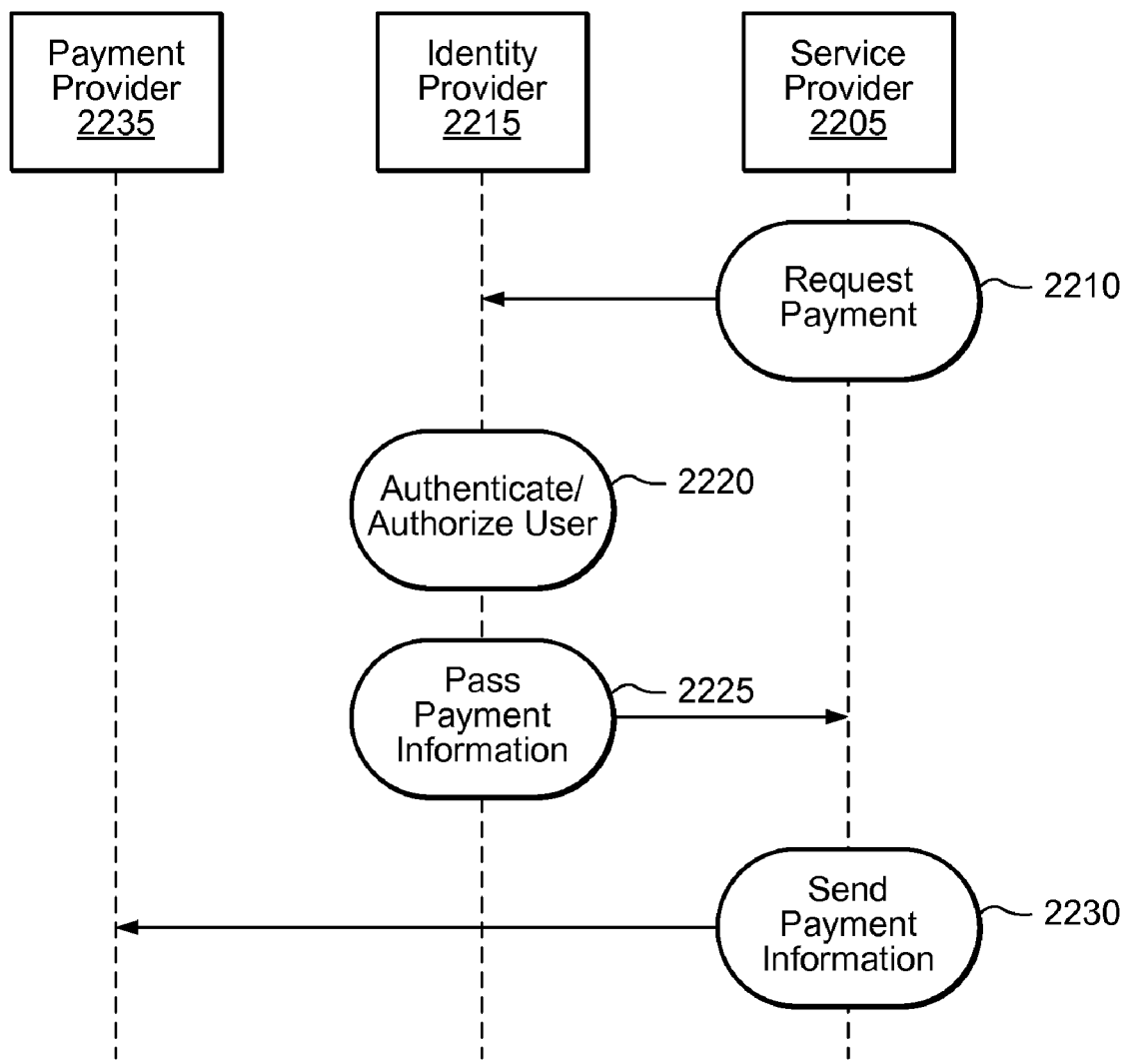
FIG. 22 is an interaction flowchart illustrating a wallet service using an identity provider as a gateway.

FIG. 22 is an interaction flowchart illustrating a wallet service using an identity provider as a gateway. Similar to the embodiment illustrated in FIG. 21, service provider 2205 requests payment 2210 from identity provider 2215. Identity provider 2215 authenticates the user and authorizes the purchase 2220. Identity provider 2215 then passes an authorization 2225 to service provider 2205. In this embodiment, however, identity provider 2215 functions as a payment processing gateway. That is, identity provider 2215 passes shipping information and payment settlement information to service provider 2205. Service provider 2205 then passes payment (e.g., billing) information 2230 to its preferred payment provider 2235 for processing.

Figure 23:
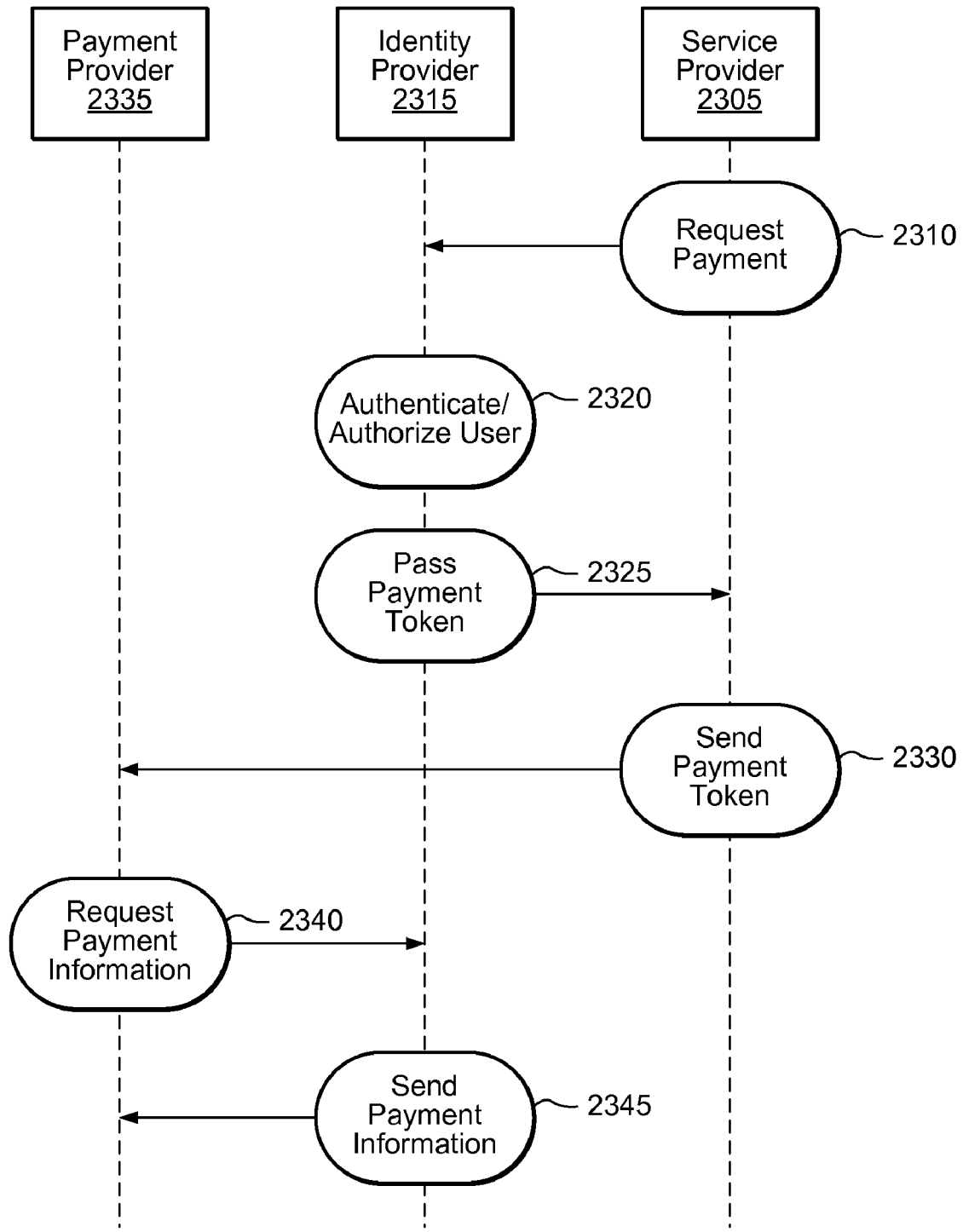
FIG. 23 is an interaction flowchart illustrating a token-based wallet service.

FIG. 23 is an interaction flowchart illustrating a token-based wallet service. When service providers contact other service providers for services such as credit card processing, transient tokens such as one-time credit card numbers can be issued and then resolved by only the service provider (e.g., a payment provider) that actually uses the information. Transient tokens have the property of being an opaque, random or pseudo-random nonce. The property of being a nonce is a countermeasure used to deter replay attacks. Randomness in such a token protects the token from being guessed by an adversary.

In the illustrated example, a transaction at a service provider merchant occurs without the service provider merchant learning the user's address or credit card number and only receiving transient tokens or pointers for each. Service provider 2305 requests payment 2310 from identity provider 2315. Identity provider 2315 authenticates the user and authorizes the requested transaction 2320. Identity provider 2315 then generates and passes a payment token 2325 to service provider 2305. Service provider 2305 sends the payment token 2330 to payment provider 2335. Payment provider 2335 can then use the token to request payment information 2340 from identity provider 2315. In response to this request, identity provider 2315 sends the actual payment information 2345 (e.g., credit card number) to payment provider 2335. One skilled in the art will recognize that in other embodiments additional service providers, for example, a shipping carrier could similarly use transient tokens or service tickets to interface with identity provider 2315.

6. Security

In an embodiment, web service requests are secured by public-key infrastructure (PKI) encryption with public-key certificates on both sides of the connection. In one embodiment, certification authorities can add a distributed network identity element to the certificate's distinguished name to certify the public-key certificates. In an alternate embodiment, a certificate policy is used rather than amending the certificate's distinguished name. A certificate policy is a named set of rules that indicate the applicability of a certificate to a particular community and/or class of application with common security requirements. Further, web service calls include an assertion in their header that can be verified in the user profile data stored by the identity provider. As described above, one skilled in the art will appreciate that SAML assertions are an example of an assertion language that can be placed in SOAP envelopes.

7. User Profile Services

Policies are used to define user-specific privacy rules that control how an identity provider disseminates user profile data and preferences to service providers or other identity providers. In an embodiment, an identity provider provides a profile service for the user in which different sets of user preferences (or attributes) are grouped with associated policies for privacy. For example, the user could have attributes such as "address" and "phone number" with an associated policy statement that these cannot be released to service providers without the user's express acknowledgement. Additionally, the user could have "favorite restaurants" and "location" attributes that can be shared with service providers without an acknowledgement. Users can further set policies for classes of services, such as weather reports and restaurant searches, that permits these service classes to request user profile data without authentication. Table 5 includes example user policies, however, one skilled in the art will recognize that numerous additional policies can be implemented.

TABLE 5

Example User Policies

| Policy | Description |
| --- | --- |
| Public | Anyone can access the information |
| Acknowledgement Required | Requires user's confirmation every time |
| Contract | Can be released to service providers that user has identified |
| Anonymous | Service provider can only get pointer or handle to the information |

In another embodiment, a user can specify the manner in which a service provider handles user profile data and preferences. For example, the user can select whether (1) the information is to be used only once and discarded, (2) the information can be saved an reused, (3) the information can be forwarded to another service provider only once then discarded, or (4) the information can be forwarded to other service providers with restriction. The identity provider provides these features for the user, either for individual attributes or on a group of attributes (e.g., a specific profile). Further, users can customize these data control for each service provider in the identity provider's user directory.

Figure 24:
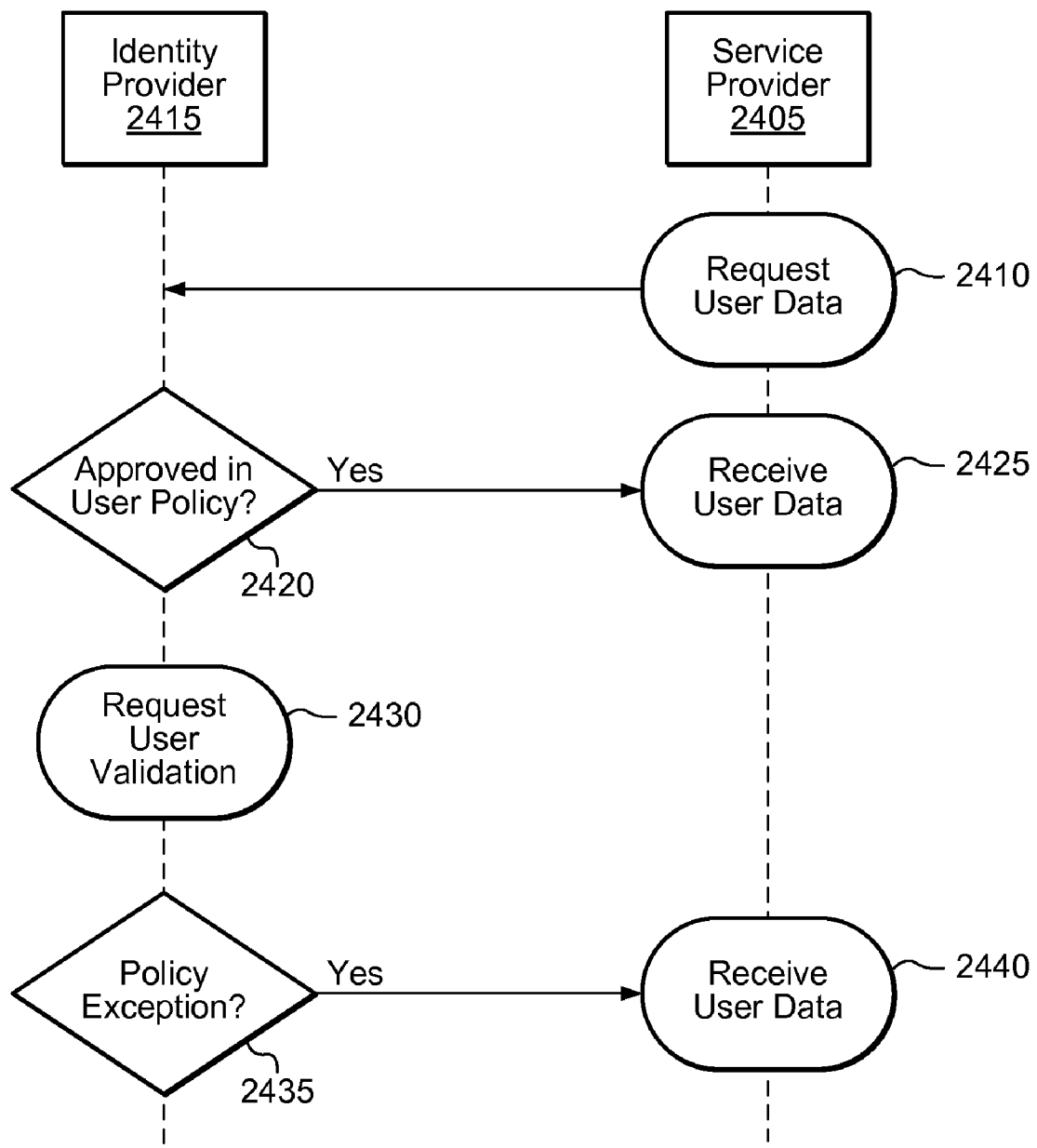
FIG. 24 is an interaction flowchart illustrating user policy validation.

FIG. 24 is an interaction flowchart illustrating user policy validation. In an embodiment, when a service provider requests information about a user from an identity provider, the identity provider validates the request against user policy and preference settings. According to one embodiment, service providers include the following in a request: (1) handle for the user, (2) list of user attributes requested, (3) privileges required for each attribute, and (4) whether the attribute's true value or handle is required.

In the illustrated validation flowchart, service provider 2405 requests user data 2410 from identity provider 2415. Identity provider 2415 optionally validates the user's credentials and the signature of service provider 2405 (not shown). Next, identity provider 2415 determines whether the data request can be approved 2420 consistent with user policy and preferences. If the user's general service provider policy or service provider-specific policy is consistent with the data requested, then service provider 2405 receives user data (or pointer) 2425. In the case where the data requested is not consistent with the general or the specific user policy for service provider 2405, identity provider 2415 requests user validation 2430. In this manner, the user has an opportunity to view the data request and the policy conflict and to accept or to reject the release of the information. If the user decides to make a policy exception 2435, then service provider 2405 receives the user data 2440.

8. User Scenarios

The following description includes further examples of how web services are used.

a) Signing Up for Web Services for Anytime, Anywhere, Any Device Access

The user wishes to sign up for an online calendar service, and be able to access the calendar from any device, anywhere, anytime. The user creates an account with a network identity-enabled calendar service. The user enters all the user's appointments in the calendar at the service provider's web site using the user's desktop browser. The user also wants to keep the user's personal digital assistant (PDA) synchronized with the user's online calendar. The user can do that by using the calendar service provider's synchronization service. While at the calendar service provider's web site, the user learns that the user could also keep the user's address book online and similarly synchronized. The user's calendar and address book would only be visible to the user, unless the user explicitly allows other parties to access it. The user also signs up for the address book service.

b) Authenticated User Invoking a Web Service Using a Browser Client

The user is at the user's desktop and wants to invoke the user's calendar to view the user's schedule for the week. The user has already logged into her network identity during this session. When the user visits the calendar service provider and automatically signs in using the user's network identity, the user's calendar pops up in a separate window. The user can view, edit, and add to the user's calendar. While logged into the user's calendar, the user receives an alert for a meeting across town starting in thirty minutes. The user exits the user's browser session and travels to the meeting by automobile.

c) Authenticated User Invoking a Web Service Using a Non-Browser Client

While in the user's automobile, the user realizes she forgot to check the exact location of the meeting. The information is stored with the user's calendar appointment. The user pulls out the user's cell phone, and launches its built-in browser. Alternatively, the user's activates the automobile's integrated Internet browser. With the touch of a button, the user is logged right into her calendar service. The user previously set up the service to log her automatically into the calendar when accessing it from the her phone or automobile. The calendar service is smart enough to know where the user is invoking the service from and responds accordingly. Sensing that the user is probably checking for her next appointment, the calendar service displays details of the user's next appointment on screen. Busy concentrating on the road, the user hits a button to have the service read the user's appointment out to her. She hears the location and disconnects.

d) Automatic Invocation of a Web Service

While in her meeting, the user hears her cell phone beep. It is an alert from the user's broker about a stock the user owns. The user previously set up a trigger with her broker service provider to alert her when the stock reached USD $80. As soon as the stock hit that price, the broker automatically sent an alert via e-mail, as well as via the short message service (SMS) feature on her mobile phone. If the user had been online at the user's desktop and logged into the user's broker service, the user could have received the alert directly on the desktop.

e) Third Party Invoking User's Web Service

The user logs in and goes to favorite Internet portal. The user clicks on calendar and selects appropriate dates for a vacation. The user taps on the vacation planning button and automatically is taken and logged into an on-line auction site or travel agent where choices for airfare, hotel, and car rentals are displayed. The user makes selection and billing occurs to a frequent flier credit card. The user is automatically taken and logged into an airline frequent flier affinity program page where an offer for an upgrade is displayed. The user selects to upgrade and the information is automatically entered into the user's favorite portal. Newspaper and mail delivery notifications are generated and logged in automatically and also entered into the calendar for notification. Finally, the user sits in the airline seat and uses his secure airline frequent flyer card to "login." The user's preferences of music and movies are pre-set, as well as the favorite reclining settings of the seat.

f) Third Party Requesting Authorization for a User's Web Service

If the travel agent service provider did not have the authority to invoke the user's calendar service, it will submit a request for authorization to the user's calendar service. It may inform the user it is doing so, and the user can then log into the user's calendar (if not already logged in) and receive the request for authorization. The user may then grant the travel agent service provider the authority to add and modify events it adds to the user's calendar until the day after the user returns from vacation. The user may also explicitly revoke this permission at any time before then.

g) User Managing Web Service Authorization Policies

The user can manage authorization policies for the user's services. At the user's service provider, the user is presented with a "control panel" web page, where the user can view each entity that has been granted access to the user's service and the level of access control granted. Each service can define its own access control levels. For example, the calendar service could have access control rights for viewing, modifying, deleting, and creating events. Access can be granted to individual users using their network identity or to other services such as the travel agent service provider in the above use case. Other services are represented by a certificate signed and verified by a network identity-approved certificate authority.

9. Enterprise User Scenarios

The following description includes three examples of distributed network identity uses in an enterprise environment:

Example 1

An insurance company called Insursave offers their customer 7 different service offerings on the Internet. Each of the programs is run by different groups and users have to create an account on each of the systems. They want to offer consumers the convenience of offering their customers bundled pricing and services. To do this, they need to tie together the distinct systems to a single, distributed, cross-domain single sign-on solution that keeps the customer data secure. Once logged into Insursave, they want customers to have the ability to easily move from service to service.

Example 2

Company A would like to create a joint customer relationship management (CRM) application with Company B. The CRM application requires a customer to have an authenticated identity with both companies. They want to create a simpler model for their joint customers by offering cross-domain single sign-on to either site.

Example 3

Company A would like to simplify employee access to over 12 different internal services. These include expense reporting, travel requests, editing/changing of benefits, access to employee discount services, etc. These systems are run by different web groups, so they would rather use a distributed system to link their different data sources together with single sign-on.

Having described embodiments of distributed network identity (which are intended to be illustrative and not limiting), it is noted that modifications and variations can be made by persons skilled in the art in light of the above teachings. It is therefore to be understood that changes may be made in the particular embodiments of the invention disclosed that are within the scope and spirit of the invention as defined by the appended claims and equivalents.

What is claimed is:

1. A method for providing user authentication to a service provider, the method comprising:
    an identity provider receiving an identifier from the service provider, wherein the identifier indicates the service provider, and wherein the identifier includes an assertion conveying information about a previous act of authentication performed on an identity of a user; and
    in response to said receiving:
        the identity provider requesting an identity credential from the user;
        the identity provider authenticating the identity credential to produce an authenticated credential; and
        the identity provider passing the authenticated credential to the service provider.

2. The method of claim 1, further comprising:
    the identity provider providing user profile data associated with the user to the service provider.

3. The method of claim 1, wherein at least one of the receiving, requesting, authenticating, and passing is performed using web services.

4. The method of claim 1, wherein the identity credential comprises a username and a password.

5. The method of claim 1, wherein the identity credential comprises a certificate.

6. The method of claim 1, wherein the authenticated credential comprises a transient token.

7. The method of claim 1, further comprising:
    the identity provider passing an identity provider preference to a common domain, wherein the identity provider preference facilitates selection of the identity provider by the service provider for subsequent authentication of the user.

8. A method for delegating a requested service, the method comprising:
    an identity provider authenticating a user;
    a first service provider receiving a request for a service from the user;
    the first service provider requesting a ticket from the identity provider for the service requested by the user, wherein the requested service is to be performed by a second service provider;
    the first service provider receiving the ticket from the identity provider, the ticket authorizing the second service provider to perform the requested service on behalf of the user;
    the first service provider presenting the ticket at the second service provider; and
    the second service provider performing the requested service on behalf of the user.

9. The method of claim 8, wherein the ticket comprises a transient token.

10. The method of claim 8, wherein the ticket is encrypted with a key corresponding to the first service provider.

11. The method of claim 8, wherein the requested service is a payment service.

12. A non-transitory, computer-readable storage medium, comprising program instructions that when executed on one or more computers cause the one or more computers to perform:
- an identity provider receiving an identifier from a service provider, wherein the identifier indicates the service provider, and wherein the identifier includes an assertion conveying information about a previous act of authentication performed on an identity of a user; and
- in response to said receiving:
  - the identity provider requesting an identity credential from the user;
  - the identity provider authenticating the identity credential to produce an authenticated credential; and
  - the identity provider passing the authenticated credential to the service provider.

13. The non-transitory, computer-readable storage medium of claim 12, wherein when executed on the one or more computers, the program instructions further cause the one or more computers to perform:
- the identity provider providing user profile data associated with the user to the service provider.

14. The non-transitory, computer-readable storage medium of claim 12, wherein at least one of the receiving, requesting, authenticating, and passing is performed using web services.

15. The non-transitory, computer-readable storage medium of claim 12, wherein the identity credential comprises a username and a password.

16. The non-transitory, computer-readable storage medium of claim 12, wherein the identity credential comprises a certificate.

17. The non-transitory, computer-readable storage medium of claim 12, wherein the authenticated credential comprises a transient token.

18. The non-transitory, computer-readable storage medium of claim 12, wherein when executed on the one or more computers, the program instructions further cause the one or more computers to perform:
- the identity provider passing an identity provider preference to a common domain, wherein the identity provider preference facilitates selection of the identity provider by the service provider for subsequent authentication of the user.

* * * * *